United States Patent
Bhuiyan et al.

(10) Patent No.: US 10,891,131 B2
(45) Date of Patent: Jan. 12, 2021

(54) PROCESSORS, METHODS, SYSTEMS, AND INSTRUCTIONS TO CONSOLIDATE DATA ELEMENTS AND GENERATE INDEX UPDATES

(71) Applicant: Intel Corporation, Santa Clara, CA (US)

(72) Inventors: Mohammad Ashraf Bhuiyan, Beaverton, OR (US); Brian R. Nickerson, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/273,146

(22) Filed: Sep. 22, 2016

(65) Prior Publication Data

US 2018/0081685 A1   Mar. 22, 2018

(51) Int. Cl.
*G06F 9/30*     (2018.01)
*G06F 13/40*    (2006.01)
*G06F 15/80*    (2006.01)

(52) U.S. Cl.
CPC ...... *G06F 9/30036* (2013.01); *G06F 9/30018* (2013.01); *G06F 9/30032* (2013.01); *G06F 13/4068* (2013.01); *G06F 15/8007* (2013.01)

(58) Field of Classification Search
None
See application file for complete search history.

(56) References Cited

U.S. PATENT DOCUMENTS

| 5,832,288 A | * | 11/1998 | Wong .................. G06F 9/30018 712/5 |
| 6,707,398 B1 | * | 3/2004 | Lin ........................ H03M 7/40 341/65 |
| 7,685,408 B2 | | 3/2010 | Wolff et al. |

(Continued)

FOREIGN PATENT DOCUMENTS

| WO | 2013095604 A1 | 6/2013 |
| WO | 2015/145193 A1 | 10/2015 |

OTHER PUBLICATIONS

Intel, "Intel 64 and IA-32 Architectures Software Developer's Manual", Oct. 2011, 526 pages.

(Continued)

*Primary Examiner* — George Giroux
(74) *Attorney, Agent, or Firm* — Nicholson De Vos Webster & Elliott LLP

(57) ABSTRACT

A decode unit to decode an instruction that indicates a source packed data that includes data elements, and indicates a source mask that includes mask elements. Each of the mask elements corresponds to a different one of the data elements. Each of the mask elements is one of a masked mask element and an unmasked mask element. The processor also includes an execution unit coupled with the decode unit. The execution unit, in response to the instruction, is to store a result packed data. When the source packed data includes one or more masked data elements disposed within unmasked data elements, the result packed data includes, the unmasked data elements consolidated together without the one or more masked data elements disposed within them. The execution unit, is to store a result in a second destination storage location that reflects a number of the unmasked data elements consolidated together.

18 Claims, 24 Drawing Sheets

(56) References Cited

U.S. PATENT DOCUMENTS

| | | | | |
|---|---|---|---|---|
| 8,359,460 | B2* | 1/2013 | Gonion | G06F 9/3001 |
| | | | | 712/222 |
| 9,411,593 | B2* | 8/2016 | Jha | G06F 9/30145 |
| 2009/0019269 | A1 | 1/2009 | Wolff et al. | |
| 2012/0254592 | A1 | 10/2012 | San Adrian et al. | |
| 2013/0114858 | A1* | 5/2013 | Allezard | G06K 9/3241 |
| | | | | 382/103 |
| 2013/0124835 | A1 | 5/2013 | Peleg et al. | |
| 2013/0275729 | A1 | 10/2013 | Abraham et al. | |
| 2014/0122831 | A1 | 5/2014 | Uliel et al. | |
| 2014/0189320 | A1* | 7/2014 | Kuo | G06F 9/3001 |
| | | | | 712/222 |
| 2014/0281396 | A1 | 9/2014 | Jha | |
| 2015/0089188 | A1* | 3/2015 | Gonion | G06F 9/30036 |
| | | | | 712/3 |
| 2016/0085547 | A1 | 3/2016 | Memon | |
| 2016/0092217 | A1* | 3/2016 | Gonion | G06F 9/30036 |
| | | | | 712/220 |
| 2016/0224514 | A1* | 8/2016 | Moudgill | G06F 15/8076 |
| 2016/0246723 | A1* | 8/2016 | Doshi | G06F 9/30043 |

OTHER PUBLICATIONS

Intel, "Intel Advanced Vector Extensions Programming Reference", Jun. 2011, 595 pages.

Intel, "Intel® Architecture Instruction Set Extensions Programming Reference", Oct. 2014, 14 pages.

International Search Report and Written Opinion received for PCT Patent Application No. PCT/US2017/049408, dated Dec. 11, 2017, 16 pages.

Intel, "Intel 64 and IA-32 Architectures Software Developer's Manual", vol. 1: Basic Architecture, Order No. 253665-040US, Oct. 2011, 548 pages.

Intel, "Intel 64 and IA-32 Architectures Software Developer's Manual", vol. 2 (2A, 2B & 2C): Instruction Set Reference, A-Z, Order No. 325383-040US, Oct. 2011, 1721 pages.

Intel, "Intel 64 and IA-32 Architectures Software Developer's Manual", vol. 3 (3A, 3B & 3C): System Programming Guide, Order No. 325384-040US, Oct. 2011, 1916 pages.

International Preliminary Report on Patentability for Application No. PCT/US2017/049408 dated Apr. 4, 2019, 12 pages.

* cited by examiner

*FIG. 2*

METHOD OF PERFORMING
CONSOLIDATE DATA
ELEMENTS AND INDEX
UPDATE INSTRUCTION
224

RECEIVE INSTRUCTION INDICATING SOURCE PACKED DATA INCLUDING DATA ELEMENTS, AND SOURCE MASK INCLUDING MASK ELEMENTS, EACH OF MASK ELEMENTS CORRESPONDING TO DIFFERENT ONE OF DATA ELEMENTS, EACH OF MASK ELEMENTS BEING ONE OF MASKED MASK ELEMENT AND UNMASKED MASK ELEMENT, SOURCE PACKED DATA INCLUDING ONE OR MORE MASKED DATA ELEMENTS THAT CORRESPOND TO ONE OR MORE MASKED MASK ELEMENTS DISPOSED WITHIN UNMASKED DATA ELEMENTS THAT CORRESPOND TO UNMASKED MASK ELEMENTS — 225

STORE RESULT PACKED DATA IN FIRST DESTINATION STORAGE LOCATION IN RESPONSE TO INSTRUCTION, RESULT PACKED DATA INCLUDING, UNMASKED DATA ELEMENTS CONSOLIDATED TOGETHER WITHOUT ONE OR MORE MASKED DATA ELEMENTS DISPOSED WITHIN THEM — 226

STORE RESULT IN SECOND DESTINATION STORAGE LOCATION THAT REFLECTS NUMBER OF UNMASKED DATA ELEMENTS CONSOLIDATED TOGETHER IN RESULT PACKED DATA — 227

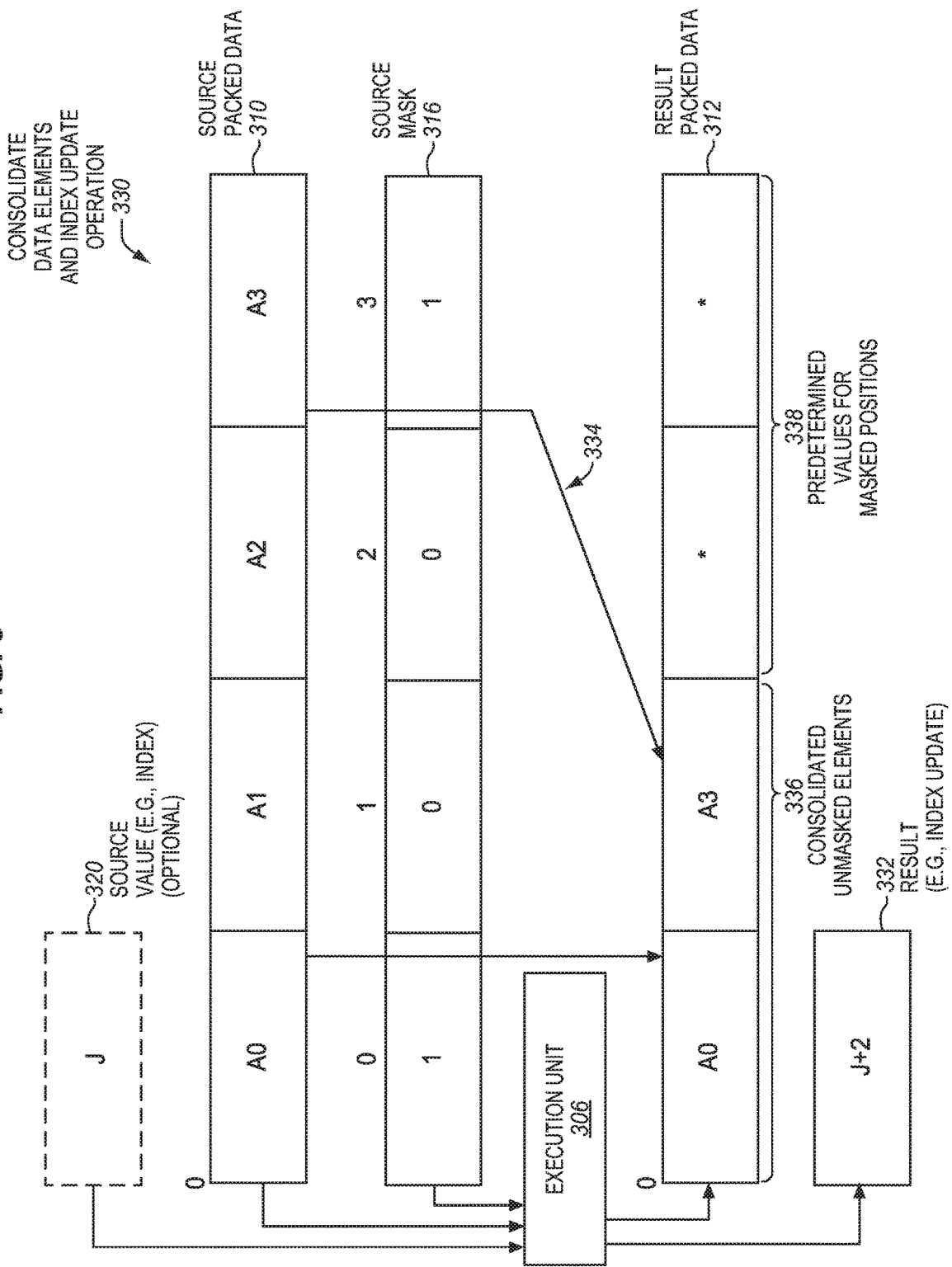

FIG. 7

CONSOLIDATE DATA ELEMENTS AND INDEX UPDATE INSTRUCTION ⟵ 702

| OPCODE | SOURCE PACKED DATA SPECIFIER | SOURCE MASK SPECIFIER | RESULT (E.G., INDEX UPDATE) SPECIFIER | DESTINATION SPECIFIER | TYPE OF MASKING SPECIFIER | DATA ELEMENT SIZE SPECIFIER |
|---|---|---|---|---|---|---|
| *770* | *771* | *772* | *773* | *774* | *775* | *776* |

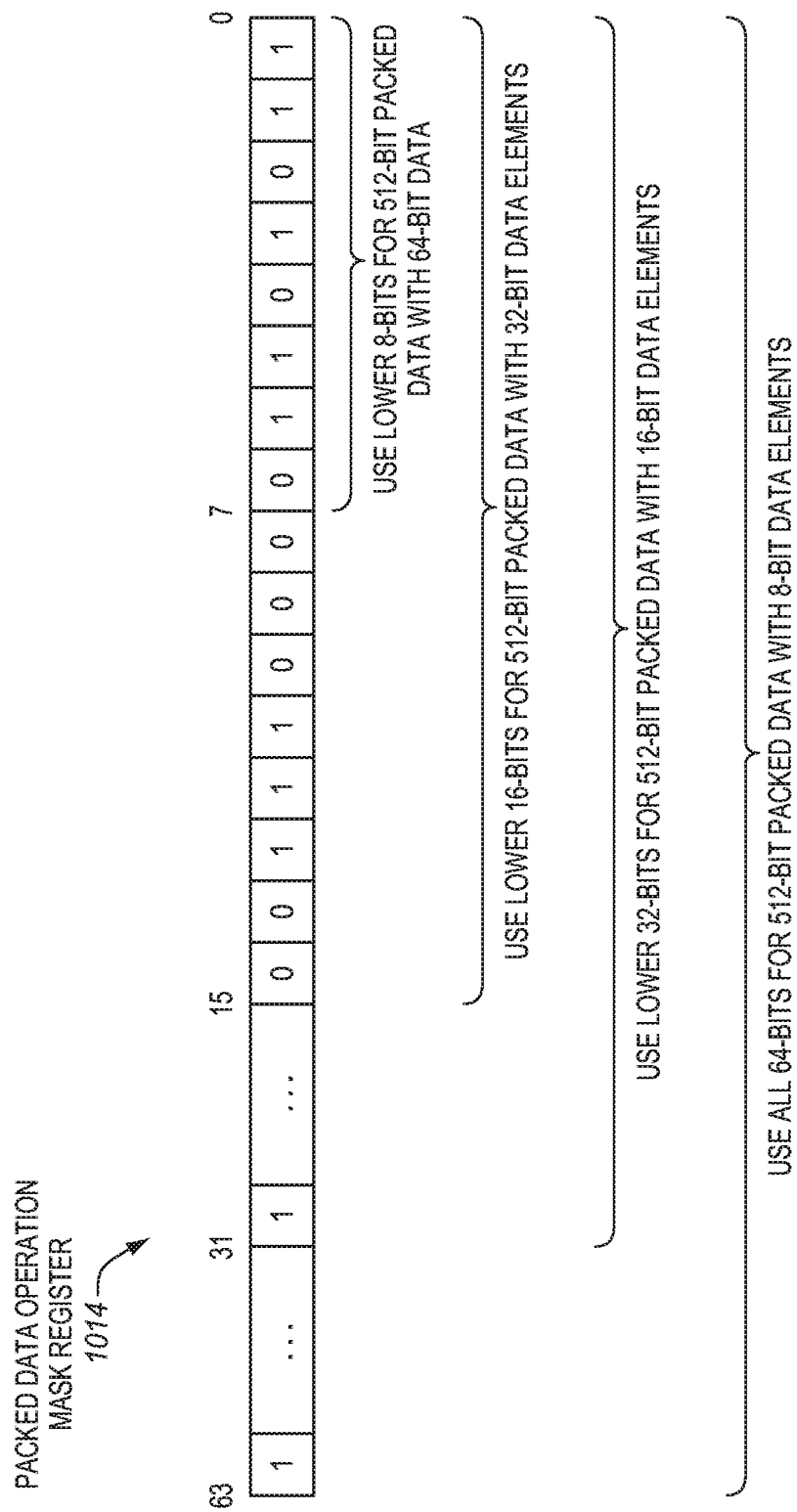

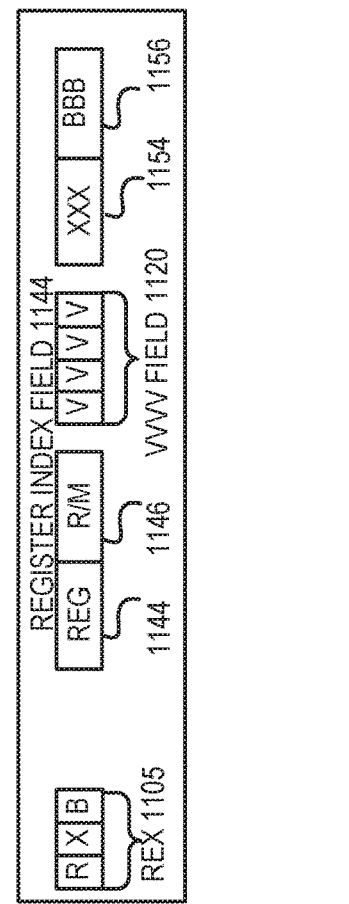
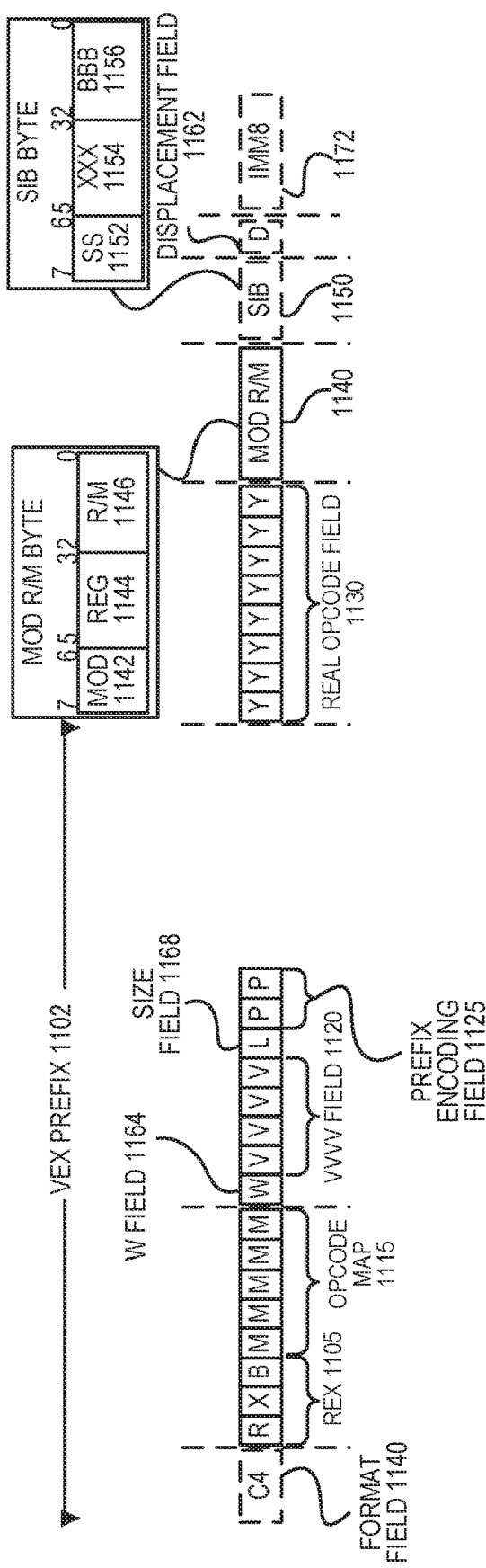
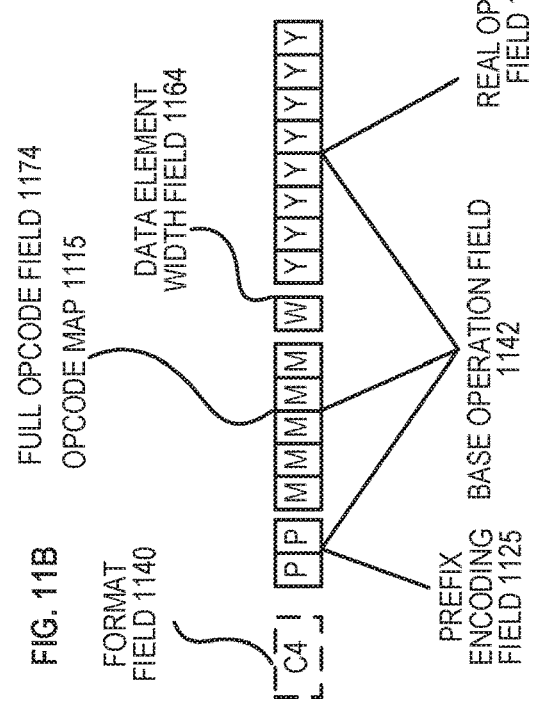

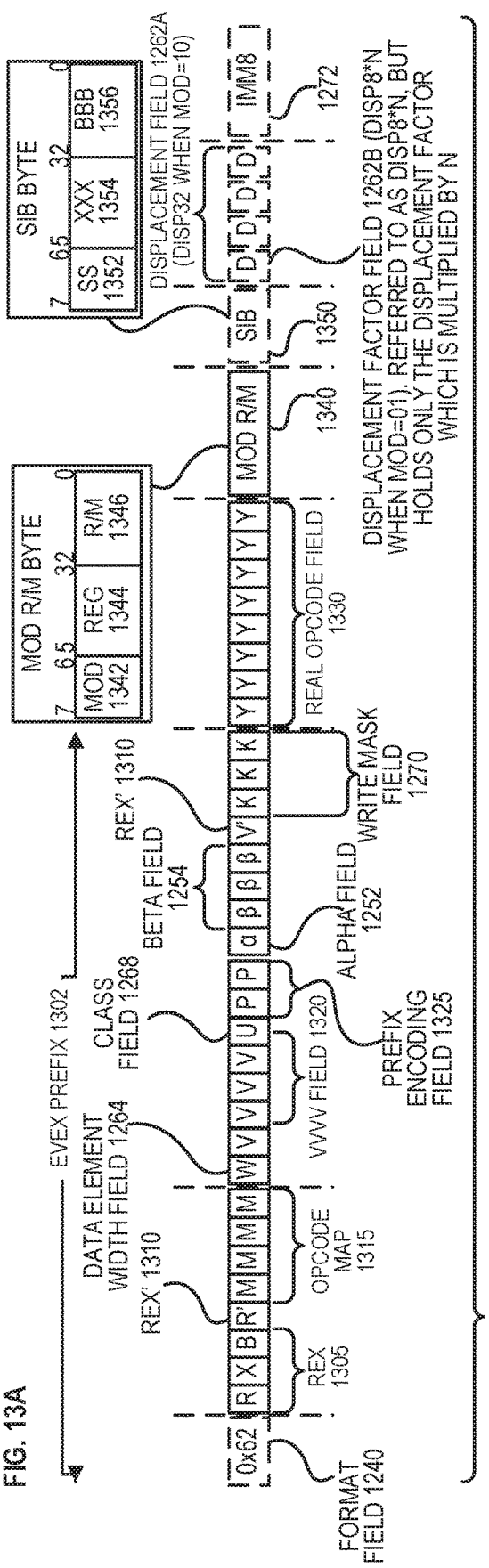

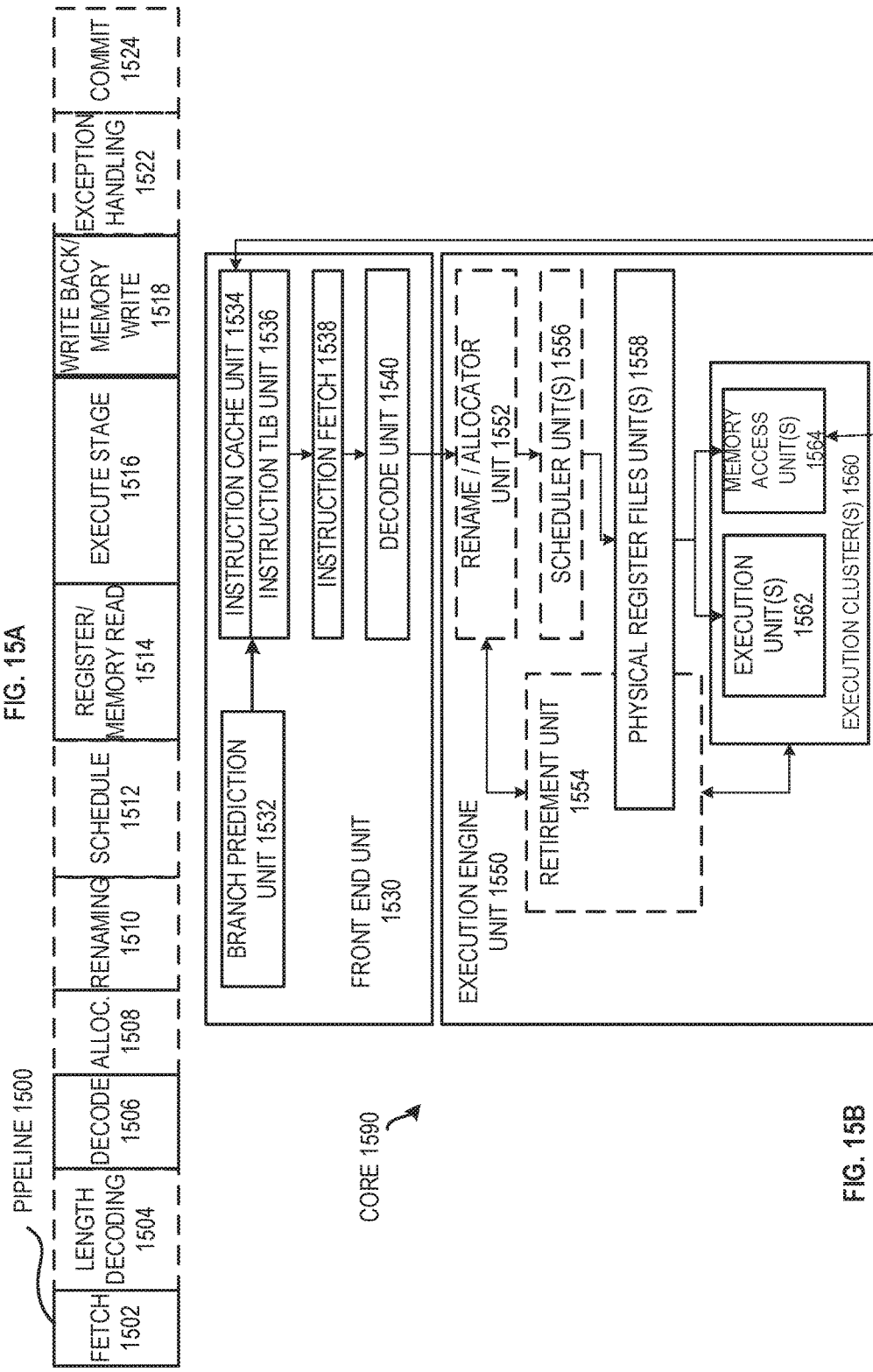
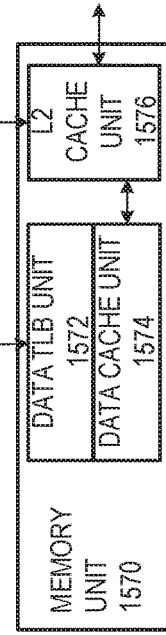

PROCESSORS, METHODS, SYSTEMS, AND INSTRUCTIONS TO CONSOLIDATE DATA ELEMENTS AND GENERATE INDEX UPDATES

BACKGROUND

Technical Field

Embodiments described herein generally relate to processors. In particular, embodiments described herein generally relate to processors that are able to process packed data.

Background Information

Many processors have Single Instruction, Multiple Data (SIMD) architectures. In SIMD architectures, a SIMD instruction, vector instruction, or packed data instruction may be used to operate on multiple data elements, or multiple pairs of data elements, simultaneously and/or in parallel. The processor may have parallel execution hardware responsive to the packed data instruction to perform the multiple operations simultaneously and/or in parallel.

Multiple data elements may be packed within one register or memory location as packed data or vector data. In packed data, the bits of the register or other storage location may be logically divided into a sequence of data elements. For example, a 128-bit wide packed data register may have two 64-bit data elements, four 32-bit data elements, eight 16-bit data elements, or sixteen 8-bit data elements. Each of the data elements may represent a separate individual piece of data (e.g., a pixel color or a component of a complex number) that may be operated on separately and/or independently of others.

BRIEF DESCRIPTION OF THE DRAWINGS

The invention may best be understood by referring to the following description and accompanying drawings that are used to illustrate embodiments. In the drawings:

FIG. 2 is a block flow diagram of an embodiment of a method of performing an embodiment of a consolidate data elements and index update instruction.

FIG. 3 is a block diagram illustrating an embodiment of a consolidate unmasked data elements and index update operation.

FIG. 7 is a block diagram of an example embodiment of a consolidate data elements and index update instruction.

FIG. 10 is a diagram illustrating that a number of bits in an example embodiment of a mask register that are used as a mask or for masking depends upon the packed data width and the data element width.

FIGS. 11A-11C are block diagrams illustrating a generic vector friendly instruction format and instruction templates thereof, according to embodiments of the invention.

FIG. 13A-D is a block diagram illustrating an exemplary specific vector friendly instruction format and fields thereof, according to embodiments of the invention.

FIG. 15A is a block diagram illustrating an embodiment of an in-order pipeline and an embodiment of a register renaming out-of-order issue/execution pipeline.

FIG. 15B is a block diagram of an embodiment of processor core including a front end unit coupled to an execution engine unit and both coupled to a memory unit.

DETAILED DESCRIPTION OF EMBODIMENTS

Figure 1:
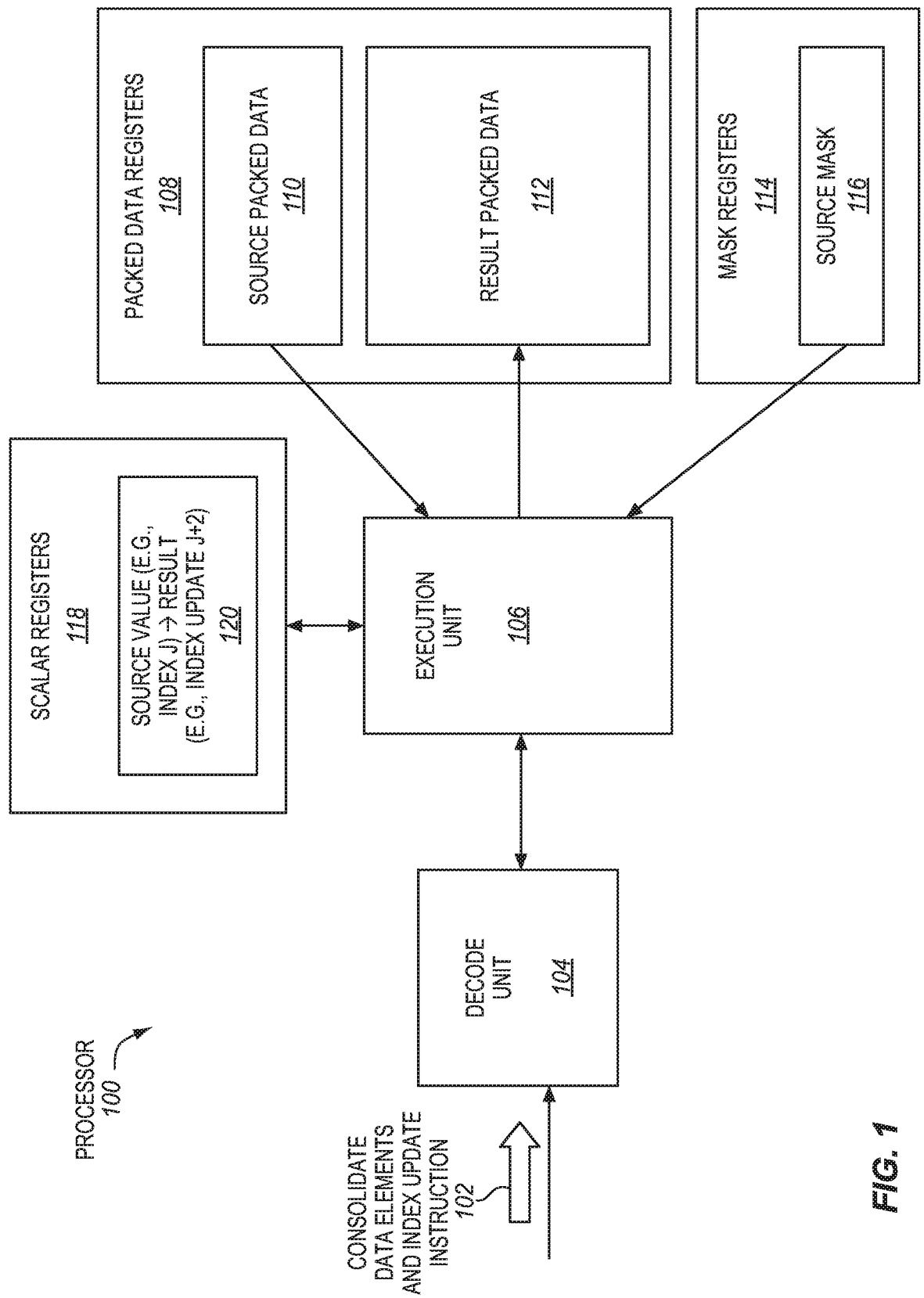
FIG. 1 is a block diagram of an embodiment of a processor that is operative to perform an embodiment of a consolidate data elements and index update instruction.

Disclosed herein are embodiments of consolidate data elements and index update instructions, embodiments of processors to perform the instructions, embodiments of methods performed by the processors when performing the instructions, embodiments of systems incorporating one or more processors to perform the instructions, and embodiments of programs or machine-readable mediums providing the instructions. In the following description, numerous specific details are set forth (e.g., specific instruction operations, data formats, processor configurations, microarchitectural details, sequences of operations, etc.). However, embodiments may be practiced without these specific details. In other instances, well-known circuits, structures and techniques have not been shown in detail to avoid obscuring the understanding of the description.

There are many situations in computing and/or data processing where it is useful and beneficial to be able to consolidate certain data elements and update an index based on the number of data elements consolidated. By way of example, the following example code:

```
j=1
Do i = 1, N //N is loop length
    If (A(i) satisfies a given condition) then
        B(j) = A(i)
        j = j + 1
    End if
End do
```

In this code, "A" represents a first array of data elements, "B" represents a second array of data element positions, "i" is a loop counter corresponding to a current position in the first array (A), "j" is an index corresponding to a current position in the second array (B), "N" is a loop length corresponding to a size of the first array (A).

Initially the index (j) is initialized to the first position in the second array (i.e., j=1). Likewise, the loop counter (i) is initialized to the first position in the first array (i.e., i=1). Within each iteration of the loop, a determination is made whether the data element at the current position "i" in the first array, A(i), satisfies a given condition. As one illustrative example, the given condition could possibly be whether A(i) is greater than some given value X, although various other conditions could instead be evaluated. If A(i) does satisfy the given condition, then the data element at the current position "i" in the first array, A(i), may be stored to the data element at the current position "j" in the second array, B(j). Additionally, the index "j" may be incremented by one in order advance to the next adjacent position in the second array.

Alternatively, if A(i) does not satisfy the given condition, then neither of these two aforementioned things may happen. Instead, the next iteration of the loop may begin, and the loop counter "i" may be incremented by one in order advance to the next adjacent position in the first array (A), without incrementing the index (j) so that the position in the second array (B) has not advanced. The index "j" or position in the second array (B) is only incremented when the data element at the current position "i" in the first array, A(i), satisfies the given condition, and is correspondingly stored to the current position "j" in the second array, B(j). This process brings together, compresses, or otherwise consolidates only those data elements of the first array (A) that satisfy the given condition, in their original sequence or ordering, into contiguous, adjacent or otherwise consolidated data element positions in the second array (B).

Such a pattern of consolidating certain data elements and updating an index based on the number of data elements consolidated is used for various purposes in computing and/or data processing. As one specific example, this pattern tends to be prevalent in molecular dynamic software, such as, for example, in the Amber molecular dynamics package and LAMPPS (Large-scale Atomic/Molecular Massively Parallel Simulator) molecular dynamics simulator. As another example, this pattern tends to be found when consolidating sparse data elements with a common attribute into a queue (e.g., in order to consolidate them together for efficient subsequent processing). As yet another example, this pattern tends to be found when converting between array-of-structures (AoS) and structure-of-arrays (SoA) arrangements. As one specific example, this may be the case when separating an array having red (R), green (G), and blue (B) pixel color components (e.g., RGBRGBRGB . . . ) into an array having only red color components (e.g., RRR . . . ).

FIG. 1 is a block diagram of an embodiment of a processor 100 that is operative to perform an embodiment of a consolidate data elements and index update instruction 102. In some embodiments, the processor may be a general-purpose processor (e.g., a general-purpose microprocessor or central processing unit (CPU) of the type used in desktop, laptop, or other computers). Alternatively, the processor may be a special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers). The processor may have any of various complex instruction set computing (CISC) architectures, reduced instruction set computing (RISC) architectures, very long instruction word (VLIW) architectures, hybrid architectures, other types of architectures, or have a combination of different architectures (e.g., different cores may have different architectures). In some embodiments, the processor may include be disposed on at least one integrated circuit or semiconductor die. In some embodiments, the processor may include at least some hardware (e.g., transistors, capacitors, diodes, circuitry, non-volatile memory storing microcode, or the like).

The processor 100 includes a set of packed data registers 108, a set of mask registers 114, and a set of scalar registers 118. Each of these registers may represent an on-die (or on integrated circuit) storage location that is operative to store data. The packed data registers may be operative to store packed data, vector data, or SIMD data. The mask registers may be operative to store masks. The scalar registers (e.g., general-purpose registers) may be operative to store scalar data. These registers may represent architecturally-visible or architectural registers that are visible to software and/or a programmer and/or are the registers indicated by instructions of the instruction set of the processor to identify operands. These architectural registers are contrasted to other non-architectural registers in a given microarchitecture (e.g., temporary registers, reorder buffers, retirement registers, etc.). These registers may be implemented in different ways in different microarchitectures, and are not limited to any particular type of design. Examples of suitable types of registers include, but are not limited to, dedicated physical registers, dynamically allocated physical registers using register renaming, and combinations thereof. Specific examples of suitable packed data registers include, but are not limited to, the packed data registers 808 of FIG. 8. Specific examples of suitable mask registers include, but are not limited to, the mask registers 914 of FIG. 9. Specific examples of suitable scalar registers include, but are not limited to, the registers 1425 of FIG. 14.

During operation, the processor 100 may fetch or otherwise receive the consolidate data elements and index update instruction 102. The instruction may represent a macroinstruction, assembly language instruction, machine code instruction, or other instruction or control signal of an instruction set of the processor. In some embodiments, the instruction may explicitly specify (e.g., through one or more fields or a set of bits), or otherwise indicate (e.g., implicitly indicate) each of: (1) a source packed data 110 that is to have a plurality of data elements; (2) a source mask 116 that is to have a plurality of mask elements; (3) a first destination storage location where a result packed data 112 is to be stored; and (4) a second destination storage location where a result (e.g., an index update) 120 is to be stored. As one example, the instruction may have source and/or destination specification fields to specify registers, memory locations, or other storage locations for the operands. Alternatively, one or more of these operands may optionally be implicit to the instruction (e.g., implicit to an opcode of the instruction).

In some embodiments, the source packed data 110 may optionally be stored in a first packed data register, and the destination storage location used to store the result packed data 112 may optionally be a second different packed data register. Alternatively, in some embodiments, the packed data register used for the source packed data may optionally be reused as the destination storage location for the result packed data. For example, a source/destination register may be implicitly or impliedly understood to be reused as both the source packed data register and the destination packed data register. Alternatively, a destination memory location may optionally be used to store the result packed data 112. As shown, in some embodiments, the result (e.g. an index update) 120 may optionally be stored in a destination scalar register in the set of scalar registers. Alternatively, a destination memory location or other storage location may optionally be used to store the result (e.g., the index update) 120. In addition, in some embodiments, the instruction may optionally indicate a source value (e.g., a source index), although this is not required. The source index may broadly be regarded as a source value. For example, in some embodiments, a source/destination scalar register or other storage location may be implicitly or impliedly understood to initially be used to store the source index or source value and later be used to store the result (e.g., an updated index or value).

Referring again to FIG. 1, the processor includes a decode unit or decoder 104. The decode unit may receive and decode the consolidate data elements and index update instruction. The decode unit may output one or more relatively lower-level instructions or control signals (e.g., one or more microinstructions, micro-operations, micro-code entry points, decoded instructions or control signals, etc.), which reflect, represent, and/or are derived from the relatively higher-level consolidate data elements and index update instruction. In some embodiments, the decode unit may include at least one input structure (e.g., a port, interconnect, or interface) to receive the instruction, an instruction recognition and decode logic coupled therewith to recognize and decode the instruction, and at least one output structure (e.g., a port, interconnect, or interface) coupled therewith to output the lower-level instructions or control signals. The decode unit may be implemented using various different mechanisms including, but not limited to, microcode read only memories (ROMs), look-up tables, hardware implementations, programmable logic arrays (PLAs), other mechanisms suitable to implement decode units, and combinations thereof. In some embodiments, the decode unit may be included on a die (e.g., on die with the execution unit 106). In some embodiments, the decode unit may include at least some hardware (e.g., one or more of transistors, integrated circuitry, on-die read-only memory or other non-volatile memory storing circuit-level instructions or microcode, etc.).

In some embodiments, instead of the consolidate data elements and index update instruction being provided directly to the decode unit, an instruction emulator, translator, morpher, interpreter, or other instruction conversion module may optionally be used. Various types of instruction conversion modules may be implemented in software, hardware, firmware, or a combination thereof. In some embodiments, the instruction conversion module may be located outside the processor, such as, for example, on a separate die and/or in a memory (e.g., as a static, dynamic, or runtime emulation module). By way of example, the instruction conversion module may receive the consolidate data elements and index update instruction, which may be of a first instruction set, and may emulate, translate, morph, interpret, or otherwise convert the consolidate data elements and index update instruction into one or more corresponding intermediate instructions or control signals, which may be of a second different instruction set. The one or more intermediate instructions or control signals of the second instruction set may be provided to a decode unit (e.g., decode unit 104), which may decode them into one or more lower-level instructions or control signals executable by native hardware of the processor (e.g., one or more execution units).

Referring again to FIG. 1, the execution unit 106 is coupled with the decode unit 104, is coupled with the packed data registers 108, is coupled with the mask registers 114, and is coupled with the scalar registers 118. In some embodiments, the execution unit may be on a die or integrated circuit with the decode unit. The execution unit may receive the one or more decoded or otherwise converted instructions or control signals that represent and/or are derived from the consolidate data elements and index update instruction. The execution unit may also receive the source packed data 110, the source mask 116, and optionally the source value (e.g., an index) 120 (e.g., in embodiments where the source value is optionally implemented).

The execution unit may be operative in response to and/or as a result of the consolidate data elements and index update instruction (e.g., in response to one or more instructions or control signals decoded from the instruction and/or in response to the instruction being decoded and/or in response to the instruction being provided to a decoder) to store the result packed data 112 in the first destination storage location indicated by the instruction, and to store the result (e.g., an index update) 120 in the second destination storage location indicated by the instruction. In some embodiments, the result (e.g., an index update) may overwrite a source value (e.g., a source index) initially in the same storage location, if the source value is optionally used.

In some embodiments, the result packed data may include unmasked data elements of the source packed data consolidated together without any masked data elements of the source packed data disposed within them. The unmasked data elements of the source packed data may represent those data elements of the source packed data that correspond to unmasked mask elements of the source mask. Typically, the corresponding data elements and mask elements may be in same relative positions within the operands (e.g., the least significant pair of data elements and mask elements may correspond to one another, the most significant pair of data elements and mask elements may correspond to one another, etc.), although other types of correspondence could alternatively optionally be used. The unmasked data elements may be collected together, brought together, made adjacent to and/or contiguous with one another, united, merged, combined, compressed, or otherwise consolidated. Various ways are contemplated for the execution unit to perform such consolidation, such as, for example, by routing data elements, repeatedly shifting data elements, copying data elements, selecting data elements, shuffling or permuting data elements, otherwise moving or rearranging data elements, or various combinations thereof.

In at least some instances, the source packed data may include both masked data elements and unmasked data elements. The masked data elements of the source packed data may represent those data elements of the source packed data that correspond to masked mask elements of the source mask. Moreover, in at least some instances, at least one of the masked data elements may be dispersed within and/or disposed within at least some of the unmasked data elements. For example, the source packed data may potentially include sparse, dispersed, or spread out unmasked data elements dispersed within masked data elements. However, in such instances, data elements may be moved and/or rearranged so that all of the unmasked data elements are consolidated together, and no masked data elements are disposed or interspersed with or between the consolidated unmasked data elements. That is, only unmasked data elements, and all unmasked data elements, may be consolidated together in contiguous and/or adjoining and/or consecutive data element positions. In addition, in some embodiments, the all of the unmasked data elements from the source packed data may be consolidated together in the result packed data in the same order or sequence as they had in the source packed data.

In some embodiments, the consolidated unmasked data elements may not entirely fill the result packed data. Different approaches are possible for determining a value for a portion of the result packed data that is not used to store the consolidated unmasked data elements. In some embodiments, one of zeroing masking and merging masking may be performed. In merging masking, if the length of the consolidated unmasked elements is less than that of the result packed data, then the upper bits of the result packed data (e.g., a destination packed data register or destination location in memory) may be unmodified. For example, the values of data elements initially present in the destination storage location immediately prior to the result packed data being stored there may be left unchanged in the same positions and merged or combined with the consolidated unmasked data elements. In zeroing masking, if the length of the consolidated unmasked elements is less than that of the result packed data, then the upper bits of the result packed data (e.g., a destination packed data register or destination storage location) may be zeroed. Either merging masking or zeroing masking may generally be used when the destination storage location is a packed data register. When the destination storage location is a destination memory location, commonly merging masking may be used, so that subsequent memory locations are not zeroed, although this is not required. In some embodiments, the instruction may have a field to indicate one of a plurality of possible approaches to be used to determine a value for a portion of the result packed data not used to store the consolidated together unmasked data elements.

In some embodiments, the unmasked data elements may be consolidated together in a least significant or lowest order portion of the result packed data (e.g., starting with bit zero of a packed data register). Alternatively, the unmasked data elements may be consolidated together in a most significant or highest order portion of the result packed data. In some embodiments, the instruction may be operative to indicate whether the unmasked data elements are to be consolidated in the least significant or most significant portion. For example, the instruction may have one or more bits or a field that may have a first value to specify that the least significant portion, or a second value to specify the most significant portion.

In some embodiments, the result (e.g., an index update) 120 may reflect a number of the unmasked data elements consolidated together in the result packed data. In some embodiments, the result may be the number of the unmasked data elements consolidated together in the result packed data. For example, if five unmasked data elements are consolidated together in the result packed data, then then number five may be stored. Representatively, the actual index may be updated by software or otherwise outside of the performance of the instruction. In other embodiments, the instruction may have a source index or other source value, and the result may be a sum or combination of the source index or other source value and the number of the unmasked data elements consolidated together in the result packed data. For example, if the source index is fifty, and five unmasked data elements are consolidated together in the result packed data, then then number fifty five may be stored. In this case, the source index is actually updated to account for the number of consolidated unmasked data elements and accordingly the result that is stored may actually represent a result updated index.

The instruction may be used for different sized operands and sizes and types of data elements. In various embodiments, the source and result packed data may be 64-bit, 128-bit, 256-bit, 512-bit, or 1024-bit packed data, although the scope of the invention is not so limited. In various embodiments, the data elements may each be 8-bits, 16-bits, 32-bit, or 64-bit data elements, and may each be integer, fixed point, or floating point format. In various embodiments, the result (e.g., index update) may be an 8-bit, 16-bit, 32-bit, or 64-bit integer, although the scope of the invention is not so limited. In some embodiments, the execution unit may perform the operations on the source operands and store the results as shown and described for any of FIGS. 3-5, although the scope of the invention is not so limited.

In some embodiments, the aspect of consolidating unmasked data elements, and providing a result (e.g., an index update), may be implicit to and/or fixed for the instruction (e.g., an opcode of the instruction), instead of being explicitly specified and/or flexible for the instruction as in the case of a shuffle instruction, permute instruction, or other such flexible instruction. The use of such a dedicated implicit aspect may help to avoid needing to generate and use explicit control (e.g., explicit control fields) to be used with a flexible instruction. In some embodiments, it may be implicit to and/or fixed for the instruction (e.g., an opcode of the instruction) that unmasked data elements are to be consolidated together regardless of any particular arrangement of the masked and unmasked data elements in the source packed data.

The execution unit and/or the processor may include specific or particular logic (e.g., transistors, integrated circuitry, or other hardware potentially combined with firmware (e.g., instructions stored in non-volatile memory) and/or software) that is operative to perform the consolidate data elements and index update instruction and/or store the results in response to and/or as a result of the consolidate data elements and index update instruction (e.g., in response to one or more instructions or control signals decoded from the instruction). By way of example, the execution unit may include an arithmetic unit, a logic unit, an arithmetic logic unit, a digital circuit to perform arithmetic and/or logical operations, a data manipulation unit, or the like. In some embodiments, the execution unit may include at least one input structure (e.g., a port, interconnect, interface) to receive the source operands, circuitry or logic coupled therewith to receive and process the source operands and generate the result operands, and at least one output structure (e.g., a port, interconnect, interface) coupled therewith to output each of the result operands.

An alternate approach, instead of using such a single instruction, could be to use multiple separate instructions. By way of example, a first instruction may be performed to consolidate the unmasked data elements from the source packed data according to a mask, a second instruction could be performed to move the mask to a general-purpose register, a third instruction (e.g., a population count instruction) could be performed to count the number of set bits in the mask, and a fourth instruction could be performed to add the counted number of set bits (e.g., representing the number of data elements consolidated) to the starting index to produce the result updated index. However, the use of four separate instructions, instead of just a single instruction, may tend to have certain drawbacks. For example, performing the three additional instructions will generally take additional execution time (e.g., additional clock cycles). Also, the three additional instructions may need to be fetched thereby consuming interconnect bandwidth and/or stored in an instruction cache thereby consuming space in the instruction cache. Further, the need to move the mask to the general-purpose register in order to perform the addition may also occupy or tie up the general-purpose register. However, by using a single instruction to both consolidate the data elements and update the index, the aforementioned drawbacks can generally be avoided. Generally to perform the single instruction will take less execution time. Also, the three additional instructions do not need to be fetched or stored in the instruction cache. Further, there is no need to move the mask to an additional general-purpose register.

In addition, in some embodiments, an efficient implementation of the consolidate data elements and index update instruction may take the same, or nearly the same, number of cycles as would be needed for an instruction that consolidate data elements without an index update, since the later type of instruction may in some cases already internally determine the number of data elements consolidated (e.g., perform an internal population count operation or the like) in order to be able to know if a store would span two cache lines. This internal value is typically not used to actually provide or guide an index update, but rather is only internal and generally is not exposed architecturally outside of the execution unit. However, in the case of the consolidate data elements and index update instruction, this value or data may be leveraged. So, even when the index update operation is combined with the consolidate data elements operation, when such internal calculations are already performed, the increase in processing time may potentially tend to be relatively small.

To avoid obscuring the description, a relatively simple processor 100 has been shown and described. However, the processor may optionally include other processor components. For example, various different embodiments may include various different combinations and configurations of the components shown and described for any of FIGS. 15B, 16A-B, 17. All of the components of the processor may be coupled together to allow them to operate as intended. By way of example, considering FIG. 15B, the instruction cache unit 1534 may cache the instructions, the instruction fetch unit 1538 may fetch the instruction, the decode unit 1540 may decode the instruction, the scheduler unit 1556 may schedule the associated operations, the execution unit 1562 may perform the instruction, the retirement unit 1554 may retire the instruction, etc.

FIG. 2 is a block flow diagram of an embodiment of a method 224 of performing an embodiment of a consolidate data elements and index update instruction. In various embodiments, the method may be performed by a processor, instruction processing apparatus, digital logic device, or integrated circuit. In some embodiments, the method may be performed by and/or with the processor 100 of FIG. 1 and/or using the instruction 102 of FIG. 1. The components, features, and specific optional details described herein for the processor 100 and/or the instruction 102, also optionally apply to the method 224. Alternatively, the method 224 may be performed by and/or within a similar or different processor or apparatus and/or using a similar or different instruction. Moreover, the processor 100 may perform methods the same as, similar to, or different than the method 224.

The method includes receiving the consolidate data elements and index update instruction, at block 225. In various aspects, the instruction may be received at a processor or a portion thereof (e.g., an instruction fetch unit, a decode unit, a bus interface unit, etc.). In various aspects, the instruction may be received from an off-processor and/or off-die source (e.g., from memory, interconnect, etc.), or from an on-processor and/or on-die source (e.g., from an instruction cache, instruction queue, etc.). The instruction may specify or otherwise indicate a source packed data that includes data elements, and indicate a source mask that includes mask elements. Each of the mask elements may correspond to a different one of the data elements (e.g., in a same relative position within the operands). Each of the mask elements may be one of a masked mask element and an unmasked mask element. The source packed data may, at least sometimes, include one or more masked data elements that correspond to one or more masked mask elements disposed within unmasked data elements that correspond to unmasked mask elements.

A result packed data may be stored in a first destination storage location indicated by the instruction in response to and/or as a result of the instruction, at block 226. In some embodiments, the result packed data may include the unmasked data elements consolidated together without the one or more masked data elements disposed within them.

A result may be stored in a second destination storage location, at block 227. In some embodiments, this result may that reflect a number of the unmasked data elements consolidated together in the result packed data. In one aspect, this result may be the number of the unmasked data elements. In another aspect, this result may be a sum of the number of the unmasked data elements and a source value (e.g., a source index).

The illustrated method involves architectural operations (e.g., those visible from a software perspective). In other embodiments, the method may optionally include one or more microarchitectural operations. By way of example, the instruction may be fetched, decoded, source operands may be accessed, operations to perform the instruction may be scheduled out-of-order, and an execution unit may perform microarchitectural operations to implement the instruction.

FIG. 3 is a block diagram illustrating an embodiment of a consolidate unmasked data elements and index update operation 330 that may be performed in response to an embodiment of a consolidate unmasked data elements and index update instruction. In some embodiments, the instruction may optionally specify (e.g., explicitly specify) or otherwise indicate (e.g., implicitly indicate) a source value (e.g., a source index) 320. Other embodiments may optionally omit the source value.

The instruction may specify (e.g., explicitly specify) or otherwise indicate (e.g., implicitly indicate) a source packed data 310 having a plurality of packed data elements A0-A3 and optionally others. Commonly, the number of data elements in the source packed data may be equal to the size in bits of the source packed data divided by the size in bits of a single data element. In various embodiments, the size of the source packed data may be 64-bits, 128-bits, 256-bits, 512-bits, or 1024-bits, although the scope of the invention is not so limited. In various embodiments, the size of each data element may be 8-bits, 16-bits, 32-bits, or 64-bits, although the scope of the invention is not so limited. Other packed data sizes and data element sizes are also suitable. In various embodiments, there may be at least four, at least eight, at least sixteen, or at least thirty-two data elements in the source packed data.

The instruction may also specify (e.g., explicitly specify) or otherwise indicate (e.g., implicitly indicate) a source mask 316. The mask may represent a predicate operand, conditional control operand, or mask that is used to predicate, conditionally control, or mask, whether or not packed data operations are performed (e.g., whether or not a corresponding data element is selected for consolidation). Each mask element may either have a first value to allow the operation or a second different value to not allow the operation. In some embodiments, the masking or predication may be at per-data element granularity so that operations on different data elements may be predicated or conditionally controlled separately and/or independently of others. The mask may include multiple mask elements, predicate elements, or conditional control elements. In one aspect, such elements in the mask may be included in a one-to-one correspondence with corresponding data elements in the source packed data. That is, the mask may have a mask element for each corresponding data element in the source packed data.

It is often convenient, for the data elements and corresponding mask elements to be in same relative positions within the operands, although this is not strictly required. By way of example, the least significant mask element (leftmost as shown in the illustration) may correspond to the least significant data element (A0), the next-to-least significant mask element may correspond to the next-to-least significant data element (A1), and so on. In the illustration, the corresponding mask elements and data elements are in vertical alignment. Alternatively, other conventions for correspondence may optionally be used if desired, as long as the execution unit understands what correspondence is used.

As also shown, in some embodiments, each mask element may optionally be a single mask bit, although this is not required. Alternatively, two or more bits may optionally be used for each mask element. For example, each mask element may have a same number of bits as each corresponding data element, and either a single bit of each mask element (e.g., a most significant bit, a least significant bit, or other single bit), or all of the bits of each mask element, may be used for masking. In some embodiments, the mask may be stored in one of a set of architectural mask registers. Alternatively, a general-purpose register, a packed data register, or other register or storage location may optionally be used.

According to one possible convention, as shown in the illustration, a mask bit cleared to binary zero (i.e., 0) may represent a masked or masked-out mask element for which the corresponding operation is not to be performed, whereas a mask bit set to binary one (i.e., 1) may represent an unmasked mask element for which the corresponding operation is to be performed. Alternatively, the opposite convention may optionally be used instead. In the particular illustrated example, the source mask includes, from the least significant mask bit[0] (on the left) to the most significant illustrated mask bit[3] (on the right), the bit values 1, 0, 0, 1. For this particular example, only the least significant data element (A0) and the most significant illustrated data element (A3) are unmasked, whereas the next-to-least significant data element (A1) and the next-to-most significant illustrated data element (A2) are masked. In this example, the source packed data includes masked data elements (A1 and A2) dispersed within and/or disposed within unmasked data elements (A0 and A3). This is just one example, and it is to be appreciated that the same concept applies regardless of the particular arrangement of the masked and unmasked data elements in the source packed data.

During the operation 330, the source packed data 310 and the source mask 316 may each be provided to an execution unit 306. The execution unit may perform the operation in response to and/or as a result of the instruction. The operation may be performed subject to the masking, predication, or conditional control of the source mask. A result packed data 312 may be generated and stored (e.g., in a destination packed data register or a destination memory location) in response to and/or as a result of the instruction.

In some embodiments, the result packed data may include consolidated together unmasked data elements 336 from the source packed data. In some embodiments, only unmasked data elements, and all unmasked data elements, may be consolidated together in contiguous and/or adjoining and/or consecutive data element positions. In the illustrated example, the unmasked data elements (A0 and A3) are consolidated together in the two least significant adjoining/consecutive data element positions of the result packed data. There may be no masked data elements disposed or interspersed with or between the consolidated unmasked data elements. In the illustrated example, neither of the masked data elements (A1 and A2) are shown disposed between the unmasked data elements (A0 and A3). In addition, in some embodiments, the unmasked data elements may be in the same order or sequence as in the source packed data. In the illustrated example, the order of the unmasked data elements (A0 and A3) is the same in the source packed data as in the result packed data. In the illustrated example, the unmasked data elements are shown to be consolidated together in a least significant portion of the result packed data. Alternatively, the unmasked data elements may be consolidated together in a most significant portion of the result packed data. In some embodiments, the instruction may be operative to indicate whether the unmasked data elements are to be consolidated in the least significant or most significant portion.

Different approaches may be used for a portion of the result packed data not used to store the consolidated unmasked data elements. In the illustrated example, this portion is shown by the asterisk (*) in the two most significant data element positions of the result packed data. The asterisks are used to represent predetermined values 338 that may be used for these positions, in one or more embodiments. In some embodiments, zeroing masking may optionally be performed. In other embodiments, merging masking may optionally be performed. In some embodiments, the instruction may have one or more bits or a field to indicate one of a plurality of possible approaches (e.g., zeroing masking, merging masking, or some other approach) to be used to determine a value for a portion of the result packed data not used to store the consolidated together unmasked data elements. In some embodiments, the masked data elements from the source packed data may merely be discarded without being conveyed to the result packed data.

During the operation 330, a result (e.g., an index update) 332 may also be generated and stored (e.g., in a destination scalar register or a destination memory location) in response to and/or as a result of the instruction. As shown, in some embodiments, when a source value (e.g., an index) is optionally used, the result may update the source value based on the number of unmasked data elements consolidated together during the operation 330. In such a case, the result index update may actually represent an updated index (e.g., an absolute index that has been updated to account for the number of consolidated data elements). In the illustrated example, there are two unmasked data elements that are consolidated together. Accordingly, for this example, an initial index or value (J) may be updated by two, and this updated index or value (J+2) may be stored as the result (e.g., as an updated index). In other embodiments, there may not be a source value (e.g., a source index), as further explained below for FIG. 4.

Figure 4:
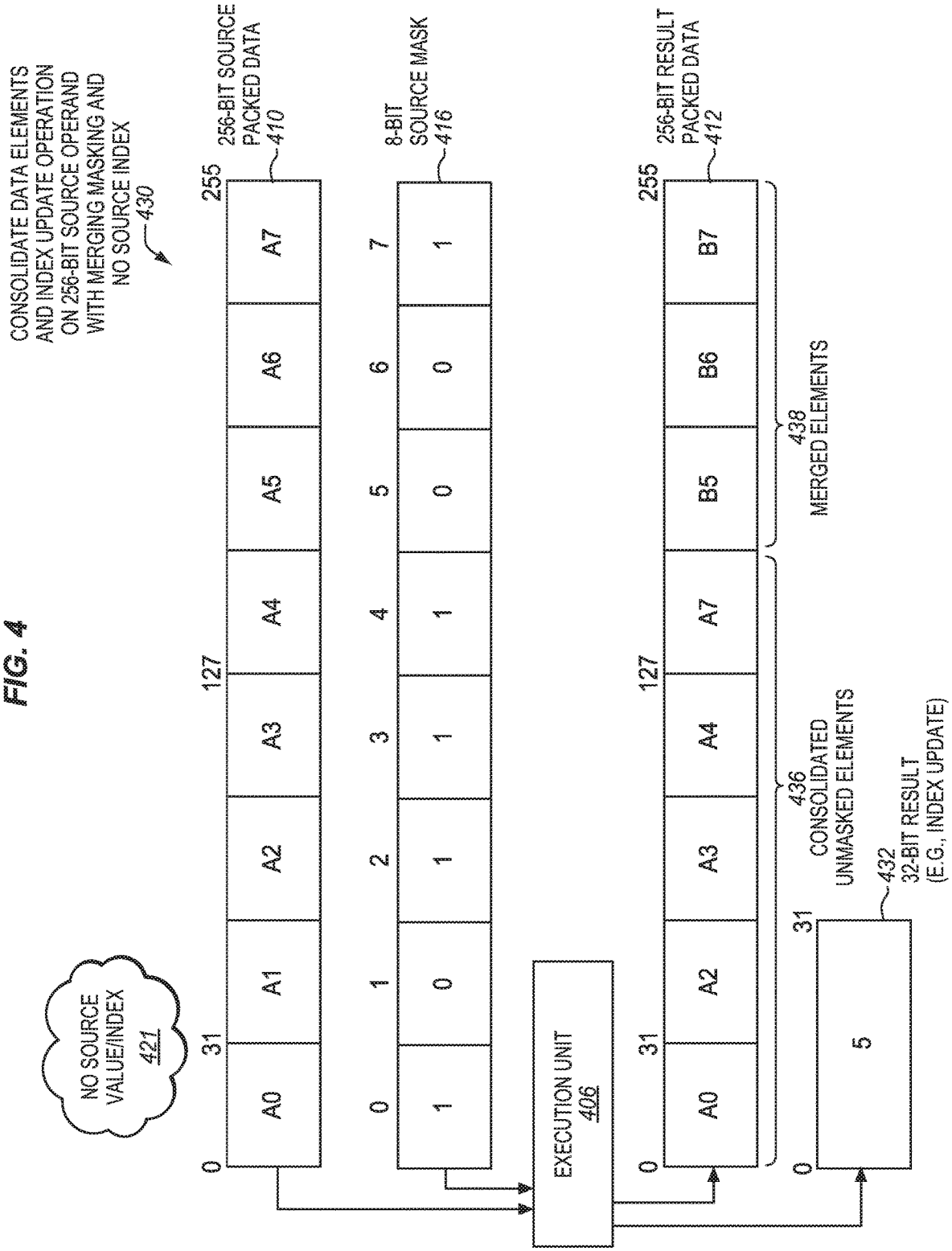
FIG. 4 is a block diagram illustrating an embodiment of a consolidate unmasked data elements and index update operation on a 256-bit source operand, with merging masking, and no source index.

FIG. 4 is a block diagram illustrating an embodiment of a consolidate unmasked data elements and index update operation 430 on a 256-bit source operand with merging masking and no source index or value that may be performed in response to an embodiment of a consolidate unmasked data elements and index update instruction. The operation of FIG. 4 has certain similarities to the operation of FIG. 3. To avoid obscuring the description, the different and/or additional characteristics for the operation of FIG. 4 will primarily be described, without repeating all the optionally similar or common characteristics and details relative to the operation of FIG. 3. However, it is to be appreciated that the previously described characteristics and details of the operation of FIG. 3 may also optionally apply to the operation of FIG. 4, unless stated otherwise or otherwise clearly apparent.

As shown at cloud 421, there may optionally not be a source index or other value. In this embodiment, the instruction may specify (e.g., explicitly specify) or otherwise indicate (e.g., implicitly indicate) a 256-bit source packed data 410 having eight packed 32-bit data elements A0-A7. In one aspect, the 32-bit data elements may be 32-bit integers. In another aspect, the 32-bit data elements may be 32-bit single precision floating point numbers.

The instruction may also specify (e.g., explicitly specify) or otherwise indicate (e.g., implicitly indicate) a source mask 416. The source mask may be similar to those previously described. In the illustrated example, the corresponding mask elements and data elements are in vertical alignment. In the illustrated example, according to one possible convention, a mask bit cleared to binary zero (i.e., 0) may represent a masked or masked-out mask element, whereas a mask bit set to binary one (i.e., 1) may represent an unmasked mask element. In the particular illustrated example, the source mask includes, from the least significant mask bit[0] (on the left) to the most significant illustrated mask bit[3] (on the right), the bit values 10111001. For this particular example, the data elements A0, A2, A3, A4, and A7 are unmasked, whereas the data elements A1, A5, and A6 are masked. In this example, the masked data elements (A1, A5, and A6) dispersed within and/or disposed within the unmasked data elements (A0, A2, A3, A4, and A7).

During the operation 430, the 256-bit source packed data 410 and the 8-bit source mask 416 may each be provided to an execution unit 406. The execution unit may perform the operation in response to and/or as a result of the instruction. A 256-bit result packed data 412 may be generated and stored (e.g., in a destination packed data register or a destination memory location) in response to and/or as a result of the instruction.

In some embodiments, the 256-bit result packed data 412 may include consolidated together unmasked data elements 436 from the source packed data. In some embodiments, only unmasked data elements, and all unmasked data elements, may be consolidated together in contiguous and/or adjoining and/or consecutive data element positions. In the illustrated example, the unmasked data elements (A0, A2, A3, A4, and A7) are consolidated together in the five least significant adjoining/consecutive data element positions of the result packed data. There may be no masked data elements disposed or interspersed with or between the consolidated unmasked data elements. In the illustrated example, neither of the masked data elements (A1, A5, and A6) are shown disposed between the unmasked data elements (A0, A2, A3, A4, and A7). In addition, in some embodiments, the unmasked data elements may be in the same order or sequence as in the source packed data. In the illustrated example, the order of the unmasked data elements (A0, A2, A3, A4, and A7) is the same in the source packed data as in the result packed data. In the illustrated example, the unmasked data elements are shown to be consolidated together in a least significant portion of the result packed data. Alternatively, the unmasked data elements may instead be consolidated together in a most significant portion of the result packed data. In some embodiments, the instruction may be operative to indicate whether the unmasked data elements are to be consolidated in the least significant or most significant portion.

In the embodiment of FIG. 4, merging masking is used for a portion of the result packed data not used to store the consolidated unmasked data elements. In the illustrated example, three merged data elements 438 (B5, B6, and B7) are shown in the three most significant data element positions of the result packed data. The merged data elements B5, B6, and B7 may represent initial values in the storage location, such as a packed data register or a memory location, prior to the instruction or operation being performed (e.g., immediately prior to the result packed data being stored). These initial values may be merged or combined with the consolidated unmasked data elements. For example, the consolidated unmasked data elements as generated in response to the instruction may be merged or combined with the initial data overwriting only those initial data elements in the same data element positions as the consolidated unmasked data elements (e.g., the five least significant data element positions in the illustrated example).

During the operation 430, a 32-bit result (e.g., an index update) 432 may also be generated and stored (e.g., in a destination scalar register or a destination memory location) in response to and/or as a result of the instruction. In the embodiment of FIG. 4, as shown at cloud 421, there was optionally no source index or value. In such an embodiment, the result (e.g., an index update) 432 may represent an increment or change (e.g., a number of data elements consolidated by the instruction/operation) that is subsequently to be applied to an index or value, rather than an already updated index or value. For example, the updating of the index may be applied outside of the confines of the performance of the instruction. For example, software may obtain the result index update and the index and add or otherwise apply the result index update to the index to generate an updated index. In the illustrated example, there are five unmasked data elements that are consolidated together. Accordingly, for this example, the value of five may be stored as the result (e.g., an index update).

Figure 5:
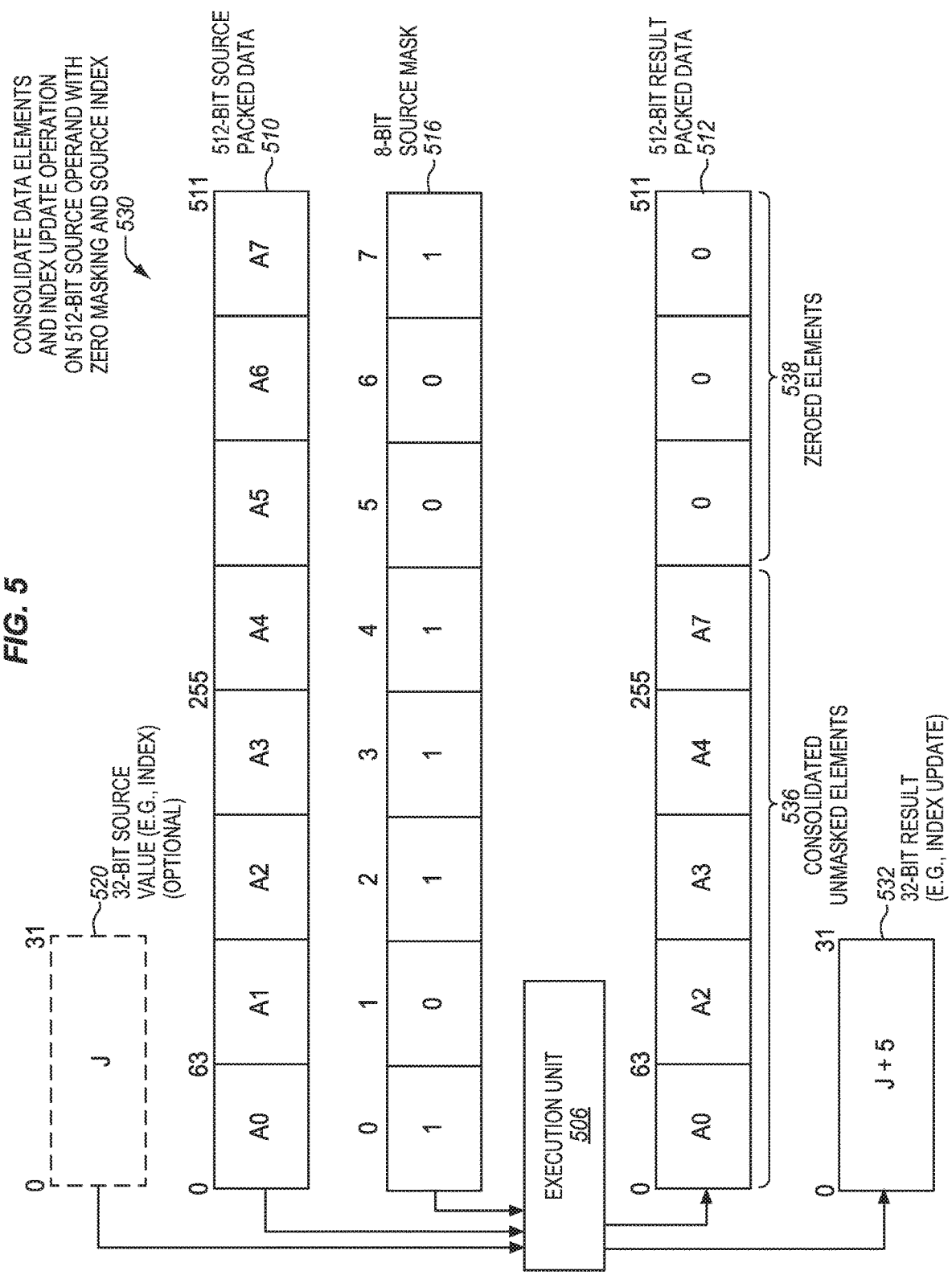
FIG. 5 is a block diagram illustrating an embodiment of a consolidate unmasked data elements and index update operation on a 512-bit source operand, with zeroing masking, and use of a source index.

FIG. 5 is a block diagram illustrating an embodiment of a consolidate unmasked data elements and index update operation 530 on a 512-bit source operand with zeroing masking and use of a source index or value that may be performed in response to an embodiment of a consolidate unmasked data elements and index update instruction. The operation of FIG. 5 has certain similarities to the operation of FIG. 3. To avoid obscuring the description, the different and/or additional characteristics for the operation of FIG. 5 will primarily be described, without repeating all the optionally similar or common characteristics and details relative to the operation of FIG. 3. However, it is to be appreciated that the previously described characteristics and details of the operation of FIG. 3 may also optionally apply to the operation of FIG. 5, unless stated otherwise or otherwise clearly apparent.

In the embodiment of FIG. 5, the instruction may optionally specify (e.g., explicitly specify) or otherwise indicate (e.g., implicitly indicate) a 32-bit source value (e.g., a source index) 520. Other embodiments may optionally omit the source value (e.g. the source index). The instruction may also specify (e.g., explicitly specify) or otherwise indicate (e.g., implicitly indicate) a 512-bit source packed data 510 having eight packed 64-bit data elements A0-A7. In one aspect, the 64-bit data elements may be 64-bit integers. In another aspect, the 64-bit data elements may be 64-bit double precision floating point numbers.

The instruction may also specify (e.g., explicitly specify) or otherwise indicate (e.g., implicitly indicate) a source mask 516. The source mask may be similar to those previously described. In the illustrated example, the corresponding mask elements and data elements are in vertical alignment. In the illustrated example, according to one possible convention, a mask bit cleared to binary zero (i.e., 0) may represent a masked or masked-out mask element, whereas a mask bit set to binary one (i.e., 1) may represent an unmasked mask element. In the particular illustrated example, the source mask includes, from the least significant mask bit[0] (on the left) to the most significant illustrated mask bit[3] (on the right), the bit values 10111001. For this particular example, the data elements A0, A2, A3, A4, and A7 are unmasked, whereas the data elements A1, A5, and A6 are masked. In this example, the masked data elements (A1, A5, and A6) dispersed within and/or disposed within the unmasked data elements (A0, A2, A3, A4, and A7).

During the operation 530, the 512-bit source packed data 510 and the 8-bit source mask 516 may each be provided to an execution unit 506. The execution unit may perform the operation in response to and/or as a result of the instruction. A 512-bit result packed data 512 may be generated and stored (e.g., in a destination packed data register or a destination memory location) in response to and/or as a result of the instruction.

In some embodiments, the 512-bit result packed data 512 may include consolidated together unmasked data elements 536 from the source packed data. In some embodiments, only unmasked data elements, and all unmasked data elements, may be consolidated together in contiguous and/or adjoining and/or consecutive data element positions. In the illustrated example, the unmasked data elements (A0, A2, A3, A4, and A7) are consolidated together in the five least significant adjoining/consecutive data element positions of the result packed data. There may be no masked data elements disposed or interspersed with or between the consolidated unmasked data elements. In the illustrated example, neither of the masked data elements (A1, A5, and A6) are shown disposed between the unmasked data elements (A0, A2, A3, A4, and A7). In addition, in some embodiments, the unmasked data elements may be in the same order or sequence as in the source packed data. In the illustrated example, the order of the unmasked data elements (A0, A2, A3, A4, and A7) is the same in the source packed data as in the result packed data. In the illustrated example, the unmasked data elements are shown to be consolidated together in a least significant portion of the result packed data. Alternatively, the unmasked data elements may instead be consolidated together in a most significant portion of the result packed data. In some embodiments, the instruction may be operative to indicate whether the unmasked data elements are to be consolidated in the least significant or most significant portion.

In the embodiment of FIG. 5, zeroing masking is used for a portion of the result packed data not used to store the consolidated unmasked data elements. In zeroing masking, if the length of the consolidated unmasked elements is less than that of the result packed data, then the upper bits of the result packed data (e.g., a destination packed data register or destination storage location) may be zeroed. In the illustrated example, three zeroed 64-bit data elements 538 are shown in the three most significant data element positions of the result packed data. For example, each of these zeroed 64-bit data elements may have sixty-four cleared bits.

During the operation 530, a 32-bit result (e.g., an index update) 532 may also be generated and stored (e.g., in a destination scalar register or a destination memory location) in response to and/or as a result of the instruction. Alternatively, other sized results may optionally be used, such as, for example, a 16-bit result, a 64-bit result, etc. As shown, in some embodiments, when the source value (e.g., a source index) 520 is optionally used, the result may update the source value (e.g., the source index) based on the number of unmasked data elements consolidated together during the operation 330. In the illustrated example, there are five unmasked data elements that are consolidated together. Accordingly, for this example, the source index or value (J) may be updated by five, and this updated index or value (J+5) may be stored as the result. In this case, the index is actually updated, and so the result index update may also be considered a result updated index. By way of example, the result (e.g., an updated index) may represent a running count of all consolidated unmasked data elements over multiple or numerous instances of the instruction being performed in order to keep track of a trailing end of the consolidated together data elements in an array in memory in order to know where to store the next segment of consolidated unmasked data elements.

Figure 6:
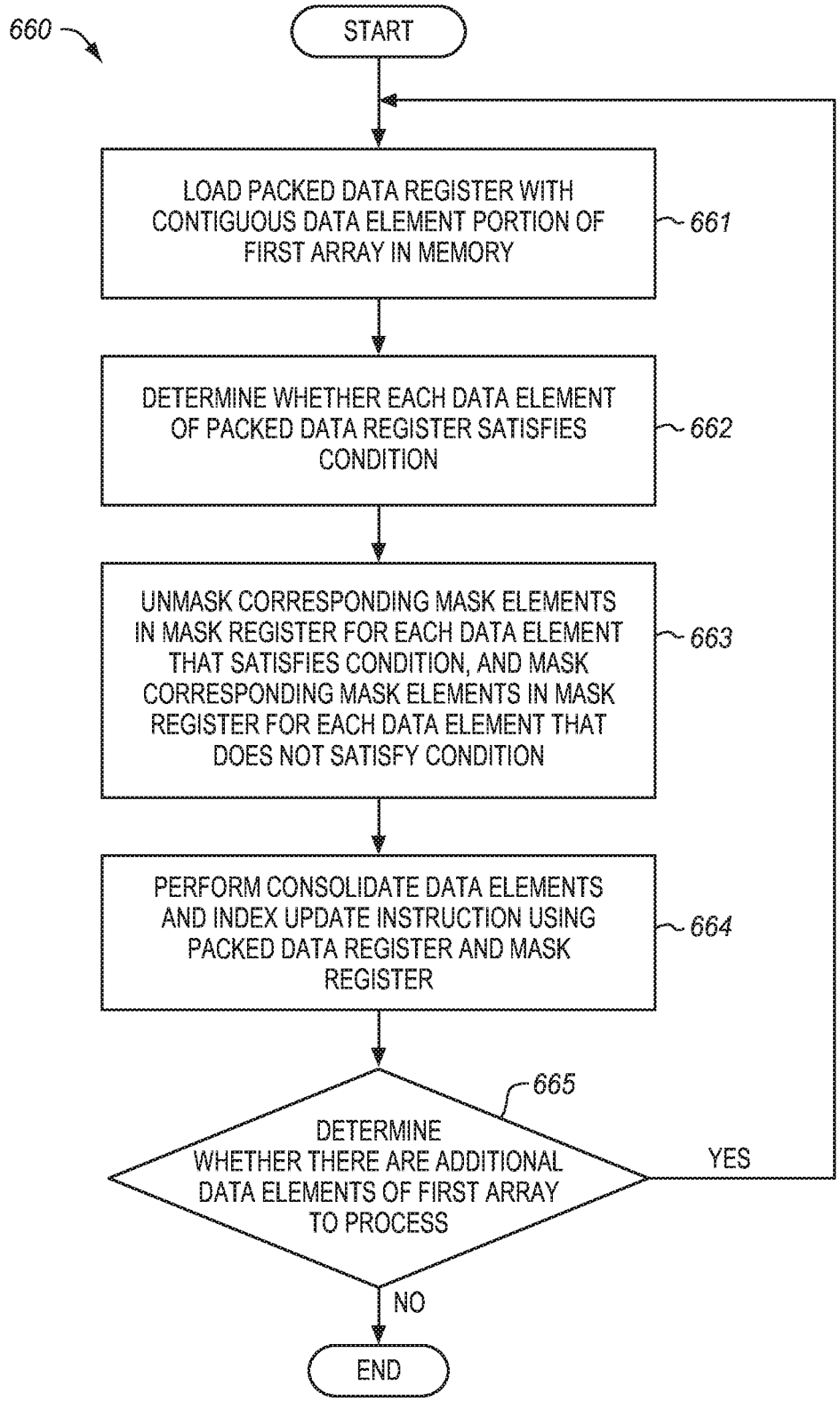
FIG. 6 is a block flow diagram of an embodiment of a method of using a consolidate data elements and index update instruction.

FIG. 6 is a block flow diagram of an embodiment of a method 660 of using a consolidate data elements and index update instruction. At block 661, a packed data register may be loaded with a contiguous data element portion of a first array in memory. For example, in the case of the packed data register accommodating sixteen data elements, a first set of sixteen contiguous data elements from the first array may be loaded or stored in the packed data register. At block 662, a determination may be made whether each data element of the packed data register satisfies a condition. By way of example, the condition may be whether the data elements are greater than a given value. Alternatively, a wide variety of other conditions may optionally be used. At block 663, for each data element that satisfies the condition, the corresponding mask elements in a mask register may be unmasked. Conversely, for each data element that does not satisfy the condition, the corresponding mask elements in the mask register may be masked. At block 664, the consolidate data elements and index update instruction may be performed using the packed data register and the mask register. At block 665, a determination may be made whether there are additional data elements of the first array to process. If there are additional data elements of the first array to process, the method may revisit block 661. Otherwise, the method may end.

FIG. 7 is a block diagram of an example embodiment of a consolidate data elements and index update instruction 702. The instruction includes an operation code or opcode 770. The opcode may represent a plurality of bits, or one or more fields, that are operative to identify the instruction and/or the operation to be performed.

The instruction also includes a source packed data specifier 771 to specify a storage location of a source packed data, a source mask specifier 772 to specify a storage location of a source mask, a result (e.g., index update) specifier 773 to specify a storage location where a result (e.g., an index update) is to be stored (and in some embodiments where a source index or value is initially to be stored), and a destination result packed data specifier 774 to specify a destination storage location where a result packed data is to be stored. By way of example, each of these specifiers may include a field or bits to specify an address of a register, memory location, or other storage location for the associated operand. Alternatively, one or more of these storage locations may optionally be implicit or inherent to the instruction (e.g., the opcode), rather than being specified. For example, the instruction may have an implicit fixed register as a storage location for an operand. As another example, in some embodiments, instead of the destination result packed data specifier 774, a storage location used for the source packed data may optionally be implicitly reused as a destination for the result packed data.

In some embodiments, the instruction may also include an optional type of masking specifier 775 to specify a type of masking. By way of example, the type of masking specifier may include a single bit that may have a first value to specify that merging masking is to be used, or a second value to specify that zeroing masking is to be used. Alternatively, the type of masking operation may optionally be implicitly indicated (e.g., implicit to the opcode or in an implicit control register).

In some embodiments, the instruction may also include an optional data element size specifier 776 to specify a data element size. By way of example, the data element size specifier may include one or more bits or a field to flexibly specify one of a multiple different data element sizes supported by the opcode. By way of example, one bit may be used to select between two different sizes (e.g., 32-bit versus 64-bit) or two bits may be used to select between up to four different sizes (e.g., 8-bits, 16-bits, 32-bits, and 64-bits). Alternatively, a size may be implicit (e.g., fixed for the opcode).

The illustration shows examples of the types of fields that may be included in an embodiment of a consolidate data elements and index update instruction. Alternate embodiments may include a subset of the illustrated fields and/or may add additional fields. The illustrated arrangement of the fields is not required, rather the fields may be rearranged variously. Moreover, each of the fields may either consist of a contiguous set of bits, or may include non-contiguous or separated bits that logically represent the field. In some embodiments, the instruction may have a VEX or EVEX encoding or format (e.g., as described further below), although this is not required.

Figure 8:
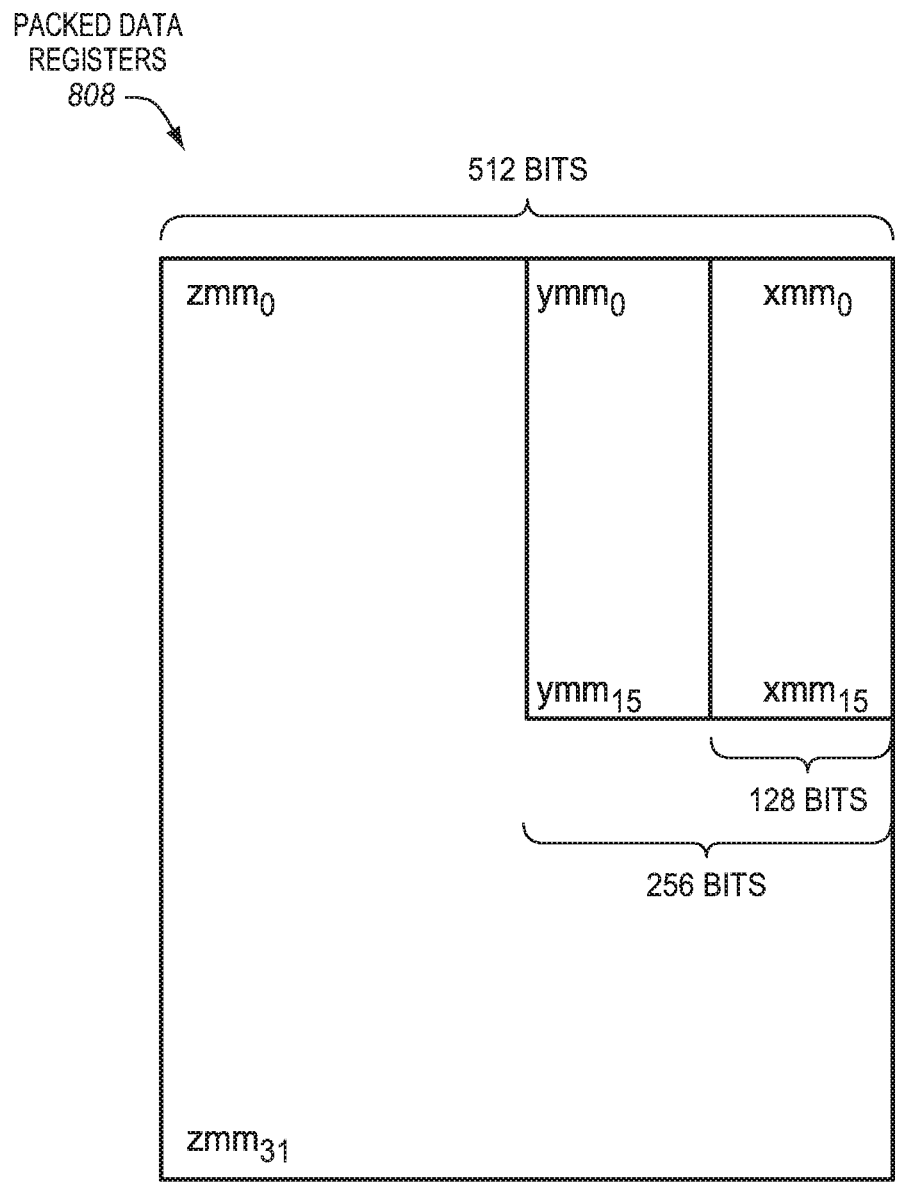
FIG. 8 is a block diagram of an example embodiment of a suitable set of packed data registers.

FIG. 8 is a block diagram of an example embodiment of a suitable set of packed data registers 808. The packed data registers include thirty-two 512-bit packed data registers labeled ZMM0 through ZMM31. In the illustrated embodiment, the lower order 256-bits of the lower sixteen registers, namely ZMM0-ZMM15, are aliased or overlaid on respective 256-bit packed data registers labeled YMM0-YMM15, although this is not required. Likewise, in the illustrated embodiment, the lower order 128-bits of the registers YMM0-YMM15 are aliased or overlaid on respective 128-bit packed data registers labeled XMM0-XMM15, although this also is not required. The 512-bit registers ZMM0 through ZMM31 are operative to hold 512-bit packed data, 256-bit packed data, or 128-bit packed data. The 256-bit registers YMM0-YMM15 are operative to hold 256-bit packed data or 128-bit packed data. The 128-bit registers XMM0-XMM15 are operative to hold 128-bit packed data. In some embodiments, each of the registers may be used to store either packed floating-point data or packed integer data. Different data element sizes are supported including at least 8-bit byte data, 16-bit word data, 32-bit doubleword, 32-bit single-precision floating point data, 64-bit quadword, and 64-bit double-precision floating point data. In alternate embodiments, different numbers of registers and/or different sizes of registers may be used. In still other embodiments, registers may or may not use aliasing of larger registers on smaller registers and/or may or may not be used to store floating point data.

Figure 9:
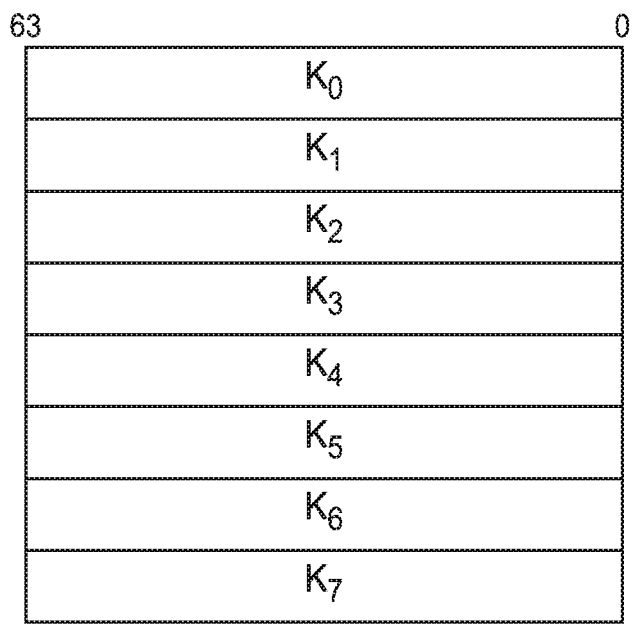
FIG. 9 is a block diagram of an example embodiment of a suitable set of mask registers.

FIG. 9 is a block diagram of an example embodiment of a suitable set of mask registers 914. In the illustrated embodiment, the set includes eight registers labeled k0 through k7. Alternate embodiments may include either fewer than eight registers (e.g., two, four, six, etc.), or more than eight registers (e.g., sixteen, thirty-two, etc.). Each of these registers may be used to store a mask. In the illustrated embodiment, each of the registers is 64-bits. In alternate embodiments, the widths of the registers may be either wider than 64-bits (e.g., 80-bits, 128-bits, etc.), or narrower than 64-bits (e.g., 8-bits, 16-bits, 32-bits, etc.). The registers may be implemented in different ways and are not limited to any particular type of circuit or design. Examples of suitable registers include, but are not limited to, dedicated physical registers, dynamically allocated physical registers using register renaming, and combinations thereof.

In some embodiments, the mask registers 914 may be a separate, dedicated set of architectural registers. In some embodiments, the instructions may encode or specify the mask registers in different bits or one or more different fields of an instruction format than those used to encode or specify other types of registers (e.g., packed data registers). By way of example, an instruction may use three bits (e.g., a 3-bit field) to encode or specify any one of the eight mask registers k0 through k7. In alternate embodiments, either fewer or more bits may be used, respectively, when there are fewer or more mask registers. In one particular implementation, only mask registers k1 through k7 (but not k0) may be addressed as a predicate operand to predicate or mask a packed data operation. The register k0 may be used as a regular source or destination, but may not be encoded as a predicate operand (e.g., if k0 is specified it has a "no mask" encoding), although this is not required.

FIG. 10 is a diagram illustrating an example embodiment of a mask register 1014 and showing that the number of bits that are used as a mask and/or for masking depends upon the packed data width and the data element width. In some embodiments, only a subset of the bits in a mask register may be used for masking. The illustrated example embodiment of the mask register is 64-bits wide, although this is not required. Depending upon the combination of the packed data width and the data element width, either all 64-bits, or only a subset of the 64-bits, may be used as a mask for masking. Generally, when a single, per-element masking control bit is used, the number of bits in the mask register that are used for masking is equal to the number of data elements in the packed data (e.g., the packed data width in bits divided by the packed data element width in bits).

Several illustrative examples are shown. Namely, when the packed data width is 512-bits and the packed data element width is 64-bits, then only the lowest-order 8-bits of the register are used as the mask. When the packed data width is 512-bits and the packed data element width is 32-bits, then only the lowest-order 16-bits of the register are used as the mask. When the packed data width is 512-bits and the packed data element width is 16-bits, then only the lowest-order 32-bits of the register are used as the mask. When the packed data width is 512-bits and the packed data element width is 8-bits, then all 64-bits of the register are used as the mask. Half as many bits may be used for these data element sizes when 256-bit packed data is used. One fourth the illustrated numbers of bits may be used for these data element sizes when 128-bit packed data is used.

In accordance with the illustrated embodiment, a masked packed data instruction may access and/or utilize only the number of lowest order or least significant bits of the register used for the mask based on that instructions associated packed data width and data element width. The bits or mask elements of the mask register used for masking or predication may be said to be active bits or active mask elements, while the others may represent inactive bits or inactive mask elements. In the illustrated embodiment, the lowest-order subset or portion of the register is used for masking, although this is not required. In alternate embodiments a highest-order subset, or some other subset, may optionally be used.

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to the Advanced Vector Extensions (AVX) (AVX1 and AVX2) and using the Vector Extensions (VEX) coding scheme, has been, has been released and/or published (e.g., see Intel® 64 and IA-32 Architectures Software Developers Manual, October 2011; and see Intel® Advanced Vector Extensions Programming Reference, June 2011).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

VEX Instruction Format

VEX encoding allows instructions to have more than two operands, and allows SIMD vector registers to be longer than 128 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 11A illustrates an exemplary AVX instruction format including a VEX prefix 1102, real opcode field 1130, Mod R/M byte 1140, SIB byte 1150, displacement field 1162, and IMM8 1172. FIG. 11B illustrates which fields from FIG. 11A make up a full opcode field 1174 and a base operation field 1142. FIG. 11C illustrates which fields from FIG. 11A make up a register index field 1144.

VEX Prefix (Bytes 0-2) 1102 is encoded in a three-byte form. The first byte is the Format Field 1140 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 1105 (VEX Byte 1, bits [7-5]) consists of a VEX.R bit field (VEX Byte 1, bit [7]—R), VEX.X bit field (VEX byte 1, bit [6]—X), and VEX.B bit field (VEX byte 1, bit[5]—B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 1115 (VEX byte 1, bits [4:0]—mmmmm) includes content to encode an implied leading opcode byte. W Field 1164 (VEX byte 2, bit [7]—W)—is represented by the notation VEX.W, and provides different functions depending on the instruction. The role of VEX.vvvv 1120 (VEX Byte 2, bits [6:3]-vvvv) may include the following: 1) VEX.vvvv encodes the first source register operand, specified in inverted (1s complement) form and is valid for instructions with 2 or more source operands; 2) VEX.vvvv encodes the destination register operand, specified in 1s complement form for certain vector shifts; or 3) VEX.vvvv does not encode any operand, the field is reserved and should contain 1111b. If VEX.L 1168 Size field (VEX byte 2, bit [2]-L)=0, it indicates 128 bit vector; if VEX.L=1, it indicates 256 bit vector. Prefix encoding field 1125 (VEX byte 2, bits [1:0]-pp) provides additional bits for the base operation field.

Real Opcode Field 1130 (Byte 3) is also known as the opcode byte. Part of the opcode is specified in this field.

MOD R/M Field 1140 (Byte 4) includes MOD field 1142 (bits [7-6]), Reg field 1144 (bits [5-3]), and R/M field 1146 (bits [2-0]). The role of Reg field 1144 may include the following: encoding either the destination register operand or a source register operand (the rrr of Rrrr), or be treated as an opcode extension and not used to encode any instruction operand. The role of R/M field 1146 may include the following: encoding the instruction operand that references a memory address, or encoding either the destination register operand or a source register operand.

Scale, Index, Base (SIB)—The content of Scale field 1150 (Byte 5) includes SS1152 (bits [7-6]), which is used for memory address generation. The contents of SIB.xxx 1154 (bits [5-3]) and SIB.bbb 1156 (bits [2-0]) have been previously referred to with regard to the register indexes Xxxx and Bbbb.

The Displacement Field 1162 and the immediate field (IMM8) 1172 contain address data.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 12A:
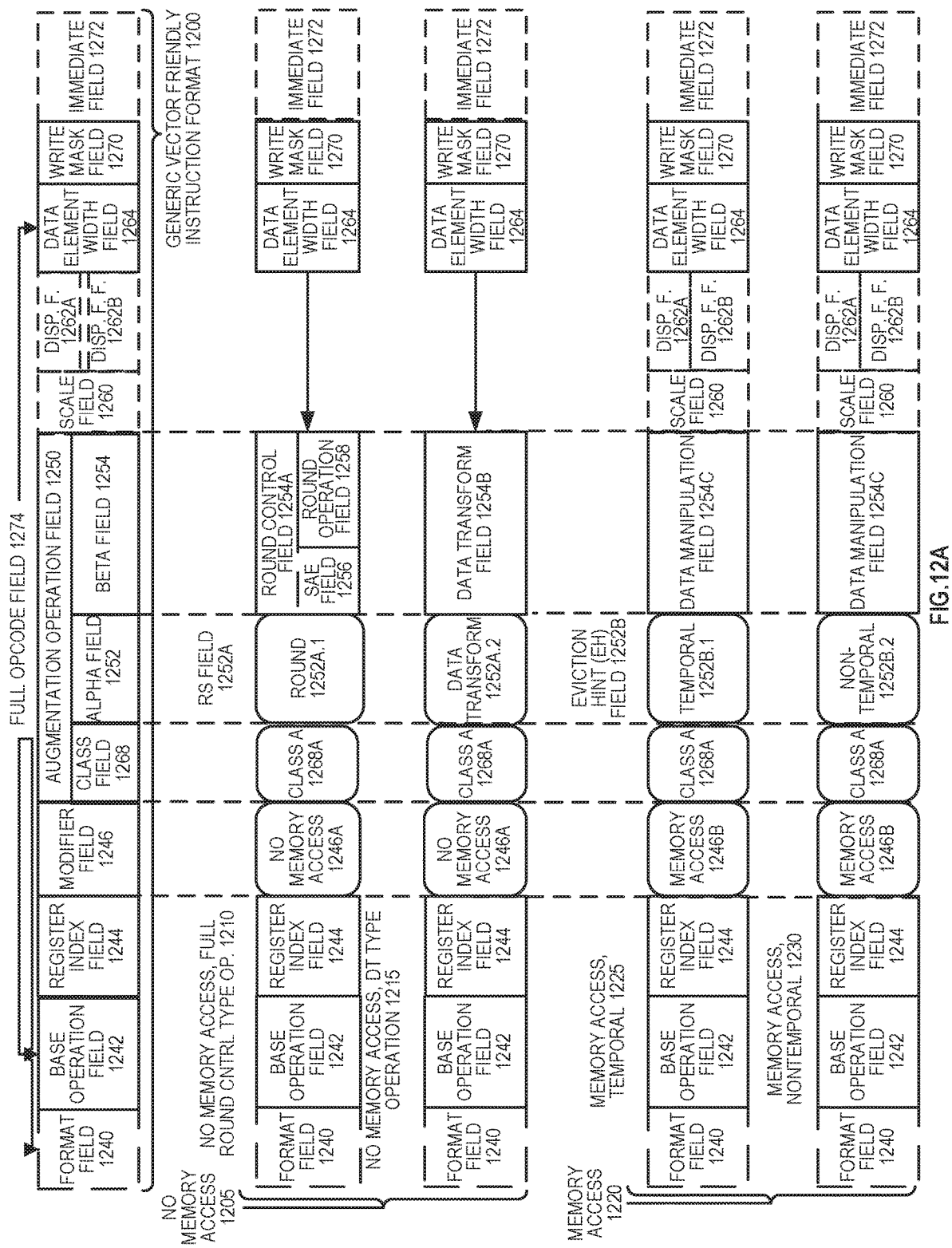
FIG. 12A-B is a block diagram illustrating an exemplary specific vector friendly instruction format and an opcode field, according to embodiments of the invention.
Figure 12B:
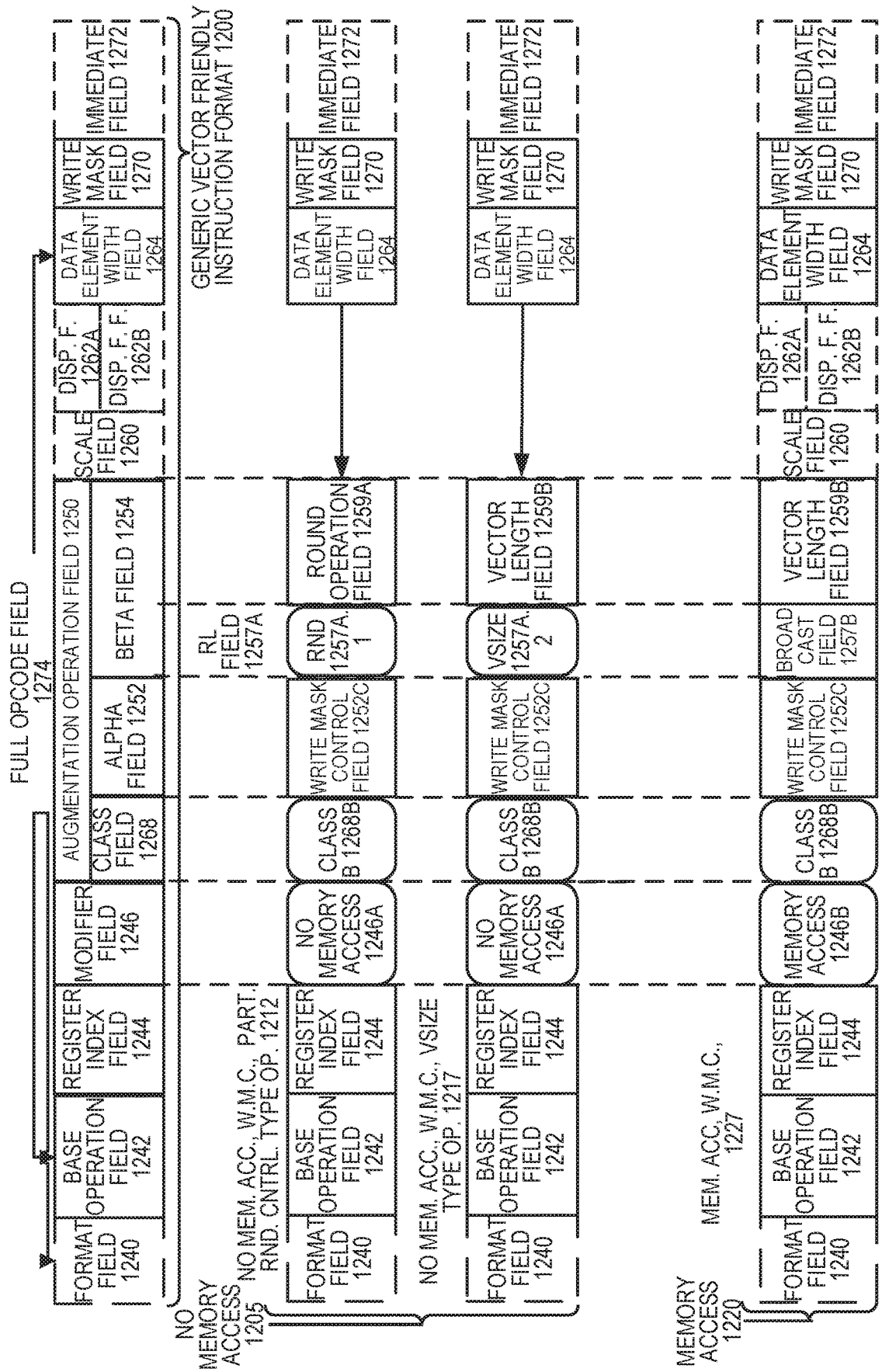

FIGS. 12A-12B are block diagrams illustrating a generic vector friendly instruction format and instruction templates thereof according to embodiments of the invention. FIG. 12A is a block diagram illustrating a generic vector friendly instruction format and class A instruction templates thereof according to embodiments of the invention; while FIG. 12B is a block diagram illustrating the generic vector friendly instruction format and class B instruction templates thereof according to embodiments of the invention. Specifically, a generic vector friendly instruction format 1200 for which are defined class A and class B instruction templates, both of which include no memory access 1205 instruction templates and memory access 1220 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 12A include: 1) within the no memory access 1205 instruction templates there is shown a no memory access, full round control type operation 1210 instruction template and a no memory access, data transform type operation 1215 instruction template; and 2) within the memory access 1220 instruction templates there is shown a memory access, temporal 1225 instruction template and a memory access, non-temporal 1230 instruction template. The class B instruction templates in FIG. 12B include: 1) within the no memory access 1205 instruction templates there is shown a no memory access, write mask control, partial round control type operation 1212 instruction template and a no memory access, write mask control, vsize type operation 1217 instruction template; and 2) within the memory access 1220 instruction templates there is shown a memory access, write mask control 1227 instruction template.

The generic vector friendly instruction format 1200 includes the following fields listed below in the order illustrated in FIGS. 12A-12B.

Format field 1240—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1242—its content distinguishes different base operations.

Register index field 1244—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1246—its content distinguishes occurrences of instructions in the generic vector instruction format that specify memory access from those that do not; that is, between no memory access 1205 instruction templates and memory access 1220 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1250—its content distinguishes which one of a variety of different operations to be performed in addition to the base operation. This field is context specific. In one embodiment of the invention, this field is divided into a class field 1268, an alpha field 1252, and a beta field 1254. The augmentation operation field 1250 allows common groups of operations to be performed in a single instruction rather than 2, 3, or 4 instructions.

Scale field 1260—its content allows for the scaling of the index field's content for memory address generation (e.g., for address generation that uses $2^{scale}*index+base$).

Displacement Field 1262A—its content is used as part of memory address generation (e.g., for address generation that uses $2^{scale}*index+base+displacement$).

Displacement Factor Field 1262B (note that the juxtaposition of displacement field 1262A directly over displacement factor field 1262B indicates one or the other is used)—its content is used as part of address generation; it specifies a displacement factor that is to be scaled by the size of a memory access (N)—where N is the number of bytes in the memory access (e.g., for address generation that uses $2^{scale}*index+base+scaled\ displacement$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1274 (described later herein) and the data manipulation field 1254C. The displacement field 1262A and the displacement factor field 1262B are optional in the sense that they are not used for the no memory access 1205 instruction templates and/or different embodiments may implement only one or none of the two.

Data element width field 1264—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1270—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1270 allows for partial vector operations, including loads, stores, arithmetic, logical, etc. While embodiments of the invention are described in which the write mask field's 1270 content selects one of a number of write mask registers that contains the write mask to be used (and thus the write mask field's 1270 content indirectly identifies that masking to be performed), alternative embodiments instead or additional allow the mask write field's 1270 content to directly specify the masking to be performed.

Immediate field 1272—its content allows for the specification of an immediate. This field is optional in the sense that is it not present in an implementation of the generic vector friendly format that does not support immediate and it is not present in instructions that do not use an immediate.

Class field 1268—its content distinguishes between different classes of instructions. With reference to FIGS. 12A-B, the contents of this field select between class A and class B instructions. In FIGS. 12A-B, rounded corner squares are used to indicate a specific value is present in a field (e.g., class A 1268A and class B 1268B for the class field 1268 respectively in FIGS. 12A-B).

Instruction Templates of Class A

In the case of the non-memory access 1205 instruction templates of class A, the alpha field 1252 is interpreted as an RS field 1252A, whose content distinguishes which one of the different augmentation operation types are to be performed (e.g., round 1252A.1 and data transform 1252A.2 are respectively specified for the no memory access, round type operation 1210 and the no memory access, data transform type operation 1215 instruction templates), while the beta field 1254 distinguishes which of the operations of the specified type is to be performed. In the no memory access 1205 instruction templates, the scale field 1260, the displacement field 1262A, and the displacement scale filed 1262B are not present.

No-Memory Access Instruction Templates—Full Round Control Type Operation

In the no memory access full round control type operation 1210 instruction template, the beta field 1254 is interpreted as a round control field 1254A, whose content(s) provide static rounding. While in the described embodiments of the invention the round control field 1254A includes a suppress all floating point exceptions (SAE) field 1256 and a round operation control field 1258, alternative embodiments may support may encode both these concepts into the same field or only have one or the other of these concepts/fields (e.g., may have only the round operation control field 1258).

SAE field 1256—its content distinguishes whether or not to disable the exception event reporting; when the SAE field's 1256 content indicates suppression is enabled, a given instruction does not report any kind of floating-point exception flag and does not raise any floating point exception handler.

Round operation control field 1258—its content distinguishes which one of a group of rounding operations to perform (e.g., Round-up, Round-down, Round-towards-zero and Round-to-nearest). Thus, the round operation control field 1258 allows for the changing of the rounding mode on a per instruction basis. In one embodiment of the invention where a processor includes a control register for specifying rounding modes, the round operation control field's 1250 content overrides that register value.

No Memory Access Instruction Templates—Data Transform Type Operation

In the no memory access data transform type operation 1215 instruction template, the beta field 1254 is interpreted as a data transform field 1254B, whose content distinguishes which one of a number of data transforms is to be performed (e.g., no data transform, swizzle, broadcast).

In the case of a memory access 1220 instruction template of class A, the alpha field 1252 is interpreted as an eviction hint field 1252B, whose content distinguishes which one of the eviction hints is to be used (in FIG. 12A, temporal 1252B.1 and non-temporal 1252B.2 are respectively specified for the memory access, temporal 1225 instruction template and the memory access, non-temporal 1230 instruction template), while the beta field 1254 is interpreted as a data manipulation field 1254C, whose content distinguishes which one of a number of data manipulation operations (also known as primitives) is to be performed (e.g., no manipulation; broadcast; up conversion of a source; and down conversion of a destination). The memory access 1220 instruction templates include the scale field 1260, and optionally the displacement field 1262A or the displacement scale field 1262B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1252 is interpreted as a write mask control (Z)

field 1252C, whose content distinguishes whether the write masking controlled by the write mask field 1270 should be a merging or a zeroing.

In the case of the non-memory access 1205 instruction templates of class B, part of the beta field 1254 is interpreted as an RL field 1257A, whose content distinguishes which one of the different augmentation operation types are to be performed (e.g., round 1257A.1 and vector length (VSIZE) 1257A.2 are respectively specified for the no memory access, write mask control, partial round control type operation 1212 instruction template and the no memory access, write mask control, VSIZE type operation 1217 instruction template), while the rest of the beta field 1254 distinguishes which of the operations of the specified type is to be performed. In the no memory access 1205 instruction templates, the scale field 1260, the displacement field 1262A, and the displacement scale filed 1262B are not present.

In the no memory access, write mask control, partial round control type operation 1210 instruction template, the rest of the beta field 1254 is interpreted as a round operation field 1259A and exception event reporting is disabled (a given instruction does not report any kind of floating-point exception flag and does not raise any floating point exception handler).

Round operation control field 1259A—just as round operation control field 1258, its content distinguishes which one of a group of rounding operations to perform (e.g., Round-up, Round-down, Round-towards-zero and Round-to-nearest). Thus, the round operation control field 1259A allows for the changing of the rounding mode on a per instruction basis. In one embodiment of the invention where a processor includes a control register for specifying rounding modes, the round operation control field's 1250 content overrides that register value.

In the no memory access, write mask control, VSIZE type operation 1217 instruction template, the rest of the beta field 1254 is interpreted as a vector length field 1259B, whose content distinguishes which one of a number of data vector lengths is to be performed on (e.g., 128, 256, or 512 byte).

In the case of a memory access 1220 instruction template of class B, part of the beta field 1254 is interpreted as a broadcast field 1257B, whose content distinguishes whether or not the broadcast type data manipulation operation is to be performed, while the rest of the beta field 1254 is interpreted the vector length field 1259B. The memory access 1220 instruction templates include the scale field 1260, and optionally the displacement field 1262A or the displacement scale field 1262B.

With regard to the generic vector friendly instruction format 1200, a full opcode field 1274 is shown including the format field 1240, the base operation field 1242, and the data element width field 1264. While one embodiment is shown where the full opcode field 1274 includes all of these fields, the full opcode field 1274 includes less than all of these fields in embodiments that do not support all of them. The full opcode field 1274 provides the operation code (opcode).

The augmentation operation field 1250, the data element width field 1264, and the write mask field 1270 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 13 is a block diagram illustrating an exemplary specific vector friendly instruction format according to embodiments of the invention. FIG. 13 shows a specific vector friendly instruction format 1300 that is specific in the sense that it specifies the location, size, interpretation, and order of the fields, as well as values for some of those fields. The specific vector friendly instruction format 1300 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 12 into which the fields from FIG. 13 map are illustrated.

It should be understood that, although embodiments of the invention are described with reference to the specific vector friendly instruction format 1300 in the context of the generic vector friendly instruction format 1200 for illustrative purposes, the invention is not limited to the specific vector friendly instruction format 1300 except where claimed. For example, the generic vector friendly instruction format 1200 contemplates a variety of possible sizes for the various fields, while the specific vector friendly instruction format 1300 is shown as having fields of specific sizes. By way of specific example, while the data element width field 1264 is illustrated as a one bit field in the specific vector friendly instruction format 1300, the invention is not so limited (that is, the generic vector friendly instruction format 1200 contemplates other sizes of the data element width field 1264).

The generic vector friendly instruction format 1200 includes the following fields listed below in the order illustrated in FIG. 13A.

EVEX Prefix (Bytes 0-3) 1302—is encoded in a four-byte form.

Format Field 1240 (EVEX Byte 0, bits [7:0])—the first byte (EVEX Byte 0) is the format field 1240 and it contains 0x62 (the unique value used for distinguishing the vector friendly instruction format in one embodiment of the invention).

The second-fourth bytes (EVEX Bytes 1-3) include a number of bit fields providing specific capability.

REX field 1305 (EVEX Byte 1, bits [7-5])—consists of a EVEX.R bit field (EVEX Byte 1, bit [7]—R), EVEX.X bit field (EVEX byte 1, bit [6]—X), and 1257BEX byte 1, bit[5]—B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1210—this is the first part of the REX' field 1210 and is the EVEX.R' bit field (EVEX Byte 1, bit [4]—R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1315 (EVEX byte 1, bits [3:0]—mmmm)—its content encodes an implied leading opcode byte (0F, 0F 38, or 0F 3).

Data element width field 1264 (EVEX byte 2, bit [7]—W)—is represented by the notation EVEX.W. EVEX.W is used to define the granularity (size) of the datatype (either 32-bit data elements or 64-bit data elements).

EVEX.vvvv 1320 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 1320 encodes the 4 low-order bits of the first source register specifier stored in inverted (1s complement) form. Depending on the instruction, an extra different EVEX bit field is used to extend the specifier size to 32 registers.

EVEX.U 1268 Class field (EVEX byte 2, bit [2]—U)—If EVEX.0=0, it indicates class A or EVEX.U0; if EVEX.0=1, it indicates class B or EVEX.U1.

Prefix encoding field 1325 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1252 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 1254 (EVEX byte 3, bits [6:4]—SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 1210—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1270 (EVEX byte 3, bits [2:0]-kkk)—its content specifies the index of a register in the write mask registers as previously described. In one embodiment of the invention, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 1330 (Byte 4) is also known as the opcode byte. Part of the opcode is specified in this field.

MOD R/M Field 1340 (Byte 5) includes MOD field 1342, Reg field 1344, and R/M field 1346. As previously described, the MOD field's 1342 content distinguishes between memory access and non-memory access operations. The role of Reg field 1344 can be summarized to two situations: encoding either the destination register operand or a source register operand, or be treated as an opcode extension and not used to encode any instruction operand. The role of R/M field 1346 may include the following: encoding the instruction operand that references a memory address, or encoding either the destination register operand or a source register operand.

Scale, Index, Base (SIB) Byte (Byte 6)—As previously described, the scale field's 1250 content is used for memory address generation. SIB.xxx 1354 and SIB.bbb 1356—the contents of these fields have been previously referred to with regard to the register indexes Xxxx and Bbbb.

Displacement field 1262A (Bytes 7-10)—when MOD field 1342 contains 10, bytes 7-10 are the displacement field 1262A, and it works the same as the legacy 32-bit displacement (disp32) and works at byte granularity.

Displacement factor field 1262B (Byte 7)—when MOD field 1342 contains 01, byte 7 is the displacement factor field 1262B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1262B is a reinterpretation of disp8; when using displacement factor field 1262B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1262B substitutes the legacy x86 instruction set 8-bit displacement. Thus, the displacement factor field 1262B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 1272 operates as previously described.

Full Opcode Field

FIG. 13B is a block diagram illustrating the fields of the specific vector friendly instruction format 1300 that make up the full opcode field 1274 according to one embodiment of the invention. Specifically, the full opcode field 1274 includes the format field 1240, the base operation field 1242, and the data element width (W) field 1264. The base operation field 1242 includes the prefix encoding field 1325, the opcode map field 1315, and the real opcode field 1330.

Register Index Field

FIG. 13C is a block diagram illustrating the fields of the specific vector friendly instruction format 1300 that make up the register index field 1244 according to one embodiment of the invention. Specifically, the register index field 1244 includes the REX field 1305, the REX' field 1310, the MODR/M.reg field 1344, the MODR/M.r/m field 1346, the VVVV field 1320, xxx field 1354, and the bbb field 1356.

Augmentation Operation Field

Figure 13D:
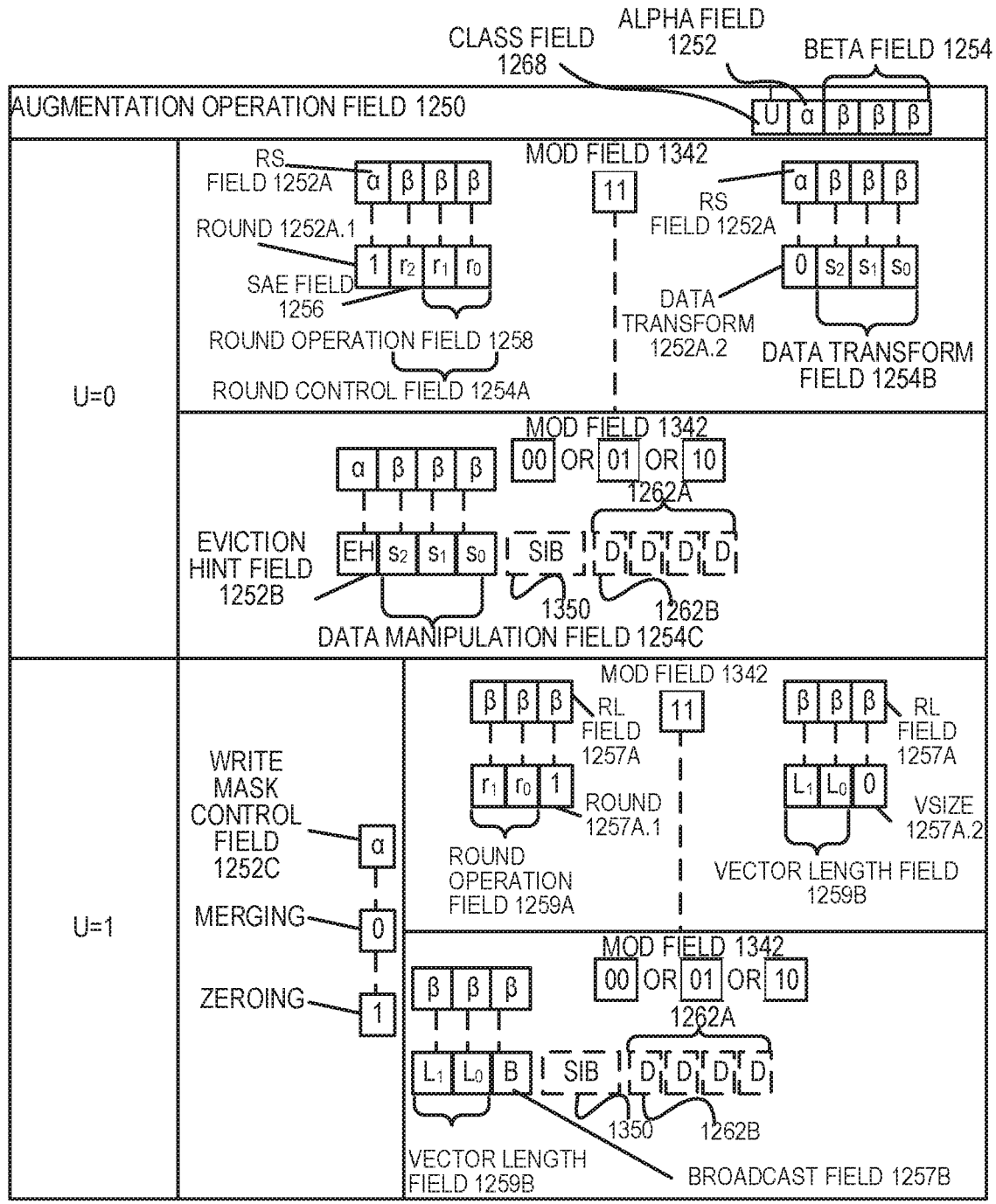

FIG. 13D is a block diagram illustrating the fields of the specific vector friendly instruction format 1300 that make up the augmentation operation field 1250 according to one embodiment of the invention. When the class (U) field 1268 contains 0, it signifies EVEX.U0 (class A 1268A); when it contains 1, it signifies EVEX.U1 (class B 1268B). When U=0 and the MOD field 1342 contains 11 (signifying a no memory access operation), the alpha field 1252 (EVEX byte 3, bit [7]—EH) is interpreted as the rs field 1252A. When the rs field 1252A contains a 1 (round 1252A.1), the beta field 1254 (EVEX byte 3, bits [6:4]—SSS) is interpreted as the round control field 1254A. The round control field 1254A includes a one bit SAE field 1256 and a two bit round operation field 1258. When the rs field 1252A contains a 0 (data transform 1252A.2), the beta field 1254 (EVEX byte 3, bits [6:4]—SSS) is interpreted as a three bit data transform field 1254B. When U=0 and the MOD field 1342 contains 00, 01, or 10 (signifying a memory access operation), the alpha field 1252 (EVEX byte 3, bit [7]—EH) is interpreted as the eviction hint (EH) field 1252B and the beta field 1254 (EVEX byte 3, bits [6:4]—SSS) is interpreted as a three bit data manipulation field 1254C.

When U=1, the alpha field 1252 (EVEX byte 3, bit [7]—EH) is interpreted as the write mask control (Z) field 1252C. When U=1 and the MOD field 1342 contains 11 (signifying a no memory access operation), part of the beta field 1254 (EVEX byte 3, bit [4]—$S_0$) is interpreted as the RL field 1257A; when it contains a 1 (round 1257A.1) the rest of the beta field 1254 (EVEX byte 3, bit [6-5]—$S_{2-1}$) is interpreted as the round operation field 1259A, while when the RL field 1257A contains a 0 (VSIZE 1257.A2) the rest of the beta field 1254 (EVEX byte 3, bit [6-5]—$S_{2-1}$) is interpreted as the vector length field 1259B (EVEX byte 3, bit [6-5]—$L_{1-0}$). When U=1 and the MOD field 1342 contains 00, 01, or 10 (signifying a memory access operation), the beta field 1254 (EVEX byte 3, bits [6:4]—SSS) is interpreted as the vector length field 1259B (EVEX byte 3, bit [6-5]—$L_{1-0}$) and the broadcast field 1257B (EVEX byte 3, bit [4]—B).

Exemplary Register Architecture

Figure 14:
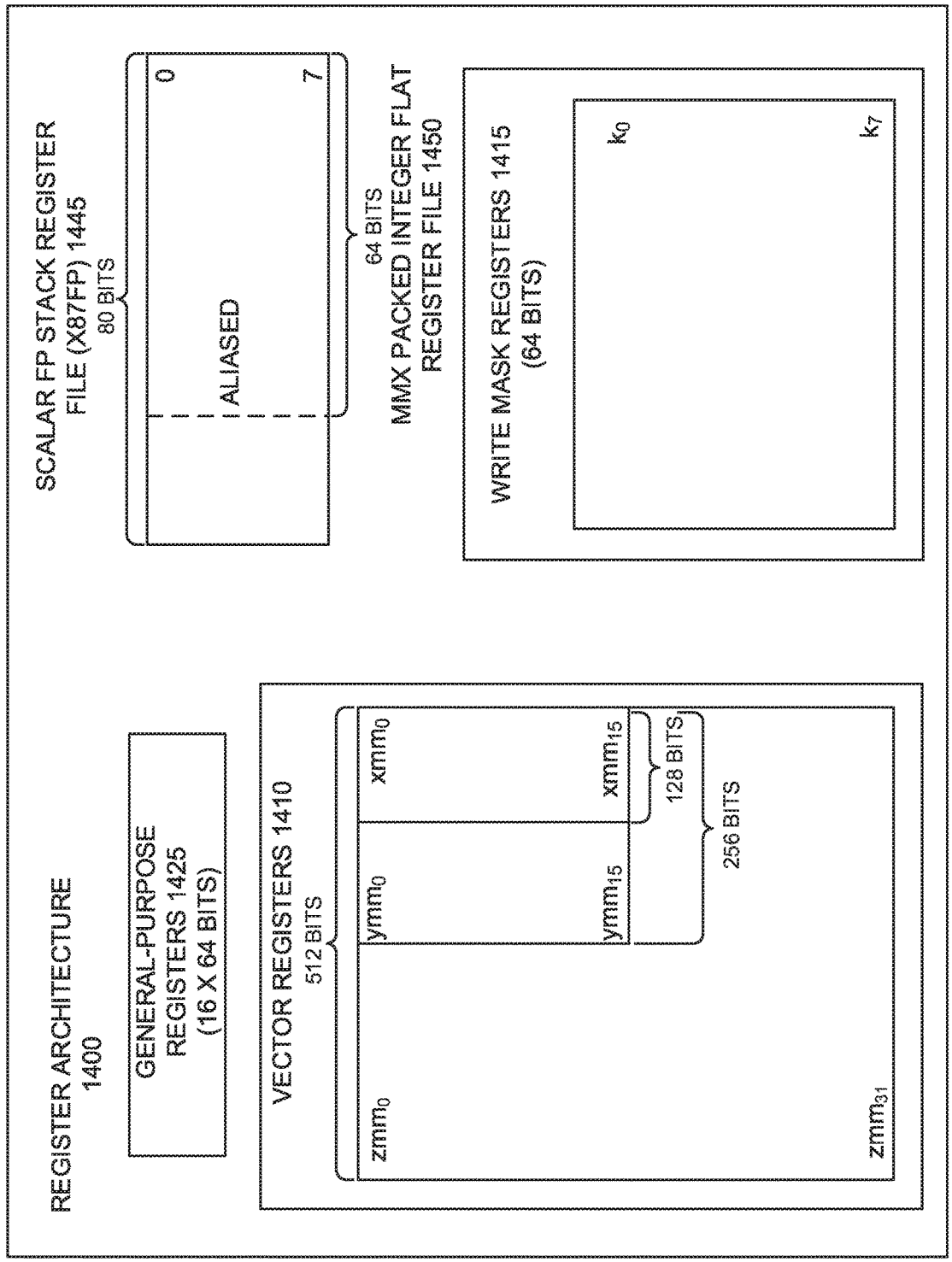
FIG. 14 is a block diagram of an embodiment of a register architecture.

FIG. 14 is a block diagram of a register architecture 1400 according to one embodiment of the invention. In the embodiment illustrated, there are 32 vector registers 1410 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1300 operates on these overlaid register file as illustrated in the below tables.

| Adjustable Vector Length | Class | Operations | Registers |
| --- | --- | --- | --- |
| Instruction Templates that do not include the vector length field 1259B | A (FIG. 12A; U = 0) | 1210, 1215, 1225, 1230 | zmm registers (the vector length is 64 byte) |
|  | B (FIG. 12B; U = 1) | 1212 | zmm registers (the vector length is 64 byte) |
| Instruction templates that do include the vector length field 1259B | B (FIG. 12B; U = 1) | 1217, 1227 | zmm, ymm, or xmm registers (the vector length is 64 byte, 32 byte, or 16 byte) depending on the vector length field 1259B |

In other words, the vector length field 1259B selects between a maximum length and one or more other shorter lengths, where each such shorter length is half the length of the preceding length; and instructions templates without the vector length field 1259B operate on the maximum vector length. Further, in one embodiment, the class B instruction templates of the specific vector friendly instruction format 1300 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1415—in the embodiment illustrated, there are 8 write mask registers (k0 through k7), each 64 bits in size. In an alternate embodiment, the write mask registers 1415 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1425—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1445, on which is aliased the MMX packed integer flat register file 1450—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 15A is a block diagram illustrating both an exemplary in-order pipeline and an exemplary register renaming, out-of-order issue/execution pipeline according to embodiments of the invention. FIG. 15B is a block diagram illustrating both an exemplary embodiment of an in-order architecture core and an exemplary register renaming, out-of-order issue/execution architecture core to be included in a processor according to embodiments of the invention. The solid lined boxes in FIGS. 15A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 15A, a processor pipeline 1500 includes a fetch stage 1502, a length decode stage 1504, a decode stage 1506, an allocation stage 1508, a renaming stage 1510, a scheduling (also known as a dispatch or issue) stage 1512, a register read/memory read stage 1514, an execute stage 1516, a write back/memory write stage 1518, an exception handling stage 1522, and a commit stage 1524.

FIG. 15B shows processor core 1590 including a front end unit 1530 coupled to an execution engine unit 1550, and both are coupled to a memory unit 1570. The core 1590 may be a reduced instruction set computing (RISC) core, a complex instruction set computing (CISC) core, a very long instruction word (VLIW) core, or a hybrid or alternative core type. As yet another option, the core 1590 may be a special-purpose core, such as, for example, a network or communication core, compression engine, coprocessor core, general purpose computing graphics processing unit (GPGPU) core, graphics core, or the like.

The front end unit 1530 includes a branch prediction unit 1532 coupled to an instruction cache unit 1534, which is coupled to an instruction translation lookaside buffer (TLB) 1536, which is coupled to an instruction fetch unit 1538, which is coupled to a decode unit 1540. The decode unit 1540 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1540 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1590 includes a microcode ROM or other medium that stores microcode for certain macroinstructions (e.g., in decode unit 1540 or otherwise within the front end unit 1530). The decode unit 1540 is coupled to a rename/allocator unit 1552 in the execution engine unit 1550.

The execution engine unit 1550 includes the rename/allocator unit 1552 coupled to a retirement unit 1554 and a set of one or more scheduler unit(s) 1556. The scheduler unit(s) 1556 represents any number of different schedulers, including reservations stations, central instruction window, etc. The scheduler unit(s) 1556 is coupled to the physical register file(s) unit(s) 1558. Each of the physical register file(s) units 1558 represents one or more physical register files, different ones of which store one or more different data types, such as scalar integer, scalar floating point, packed integer, packed floating point, vector integer, vector floating point—status (e.g., an instruction pointer that is the address of the next instruction to be executed), etc. In one embodiment, the physical register file(s) unit 1558 comprises a vector registers unit, a write mask registers unit, and a scalar registers unit. These register units may provide architectural vector registers, vector mask registers, and general purpose registers. The physical register file(s) unit(s) 1558 is overlapped by the retirement unit 1554 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1554 and the physical register file(s) unit(s) 1558 are coupled to the execution cluster(s) 1560. The execution cluster(s) 1560 includes a set of one or more execution units 1562 and a set of one or more memory access units 1564. The execution units 1562 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1556, physical register file(s) unit(s) 1558, and execution cluster(s) 1560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1564). It should also be understood that where separate pipelines are used, one or more of these pipelines may be out-of-order issue/execution and the rest in-order.

The set of memory access units 1564 is coupled to the memory unit 1570, which includes a data TLB unit 1572 coupled to a data cache unit 1574 coupled to a level 2 (L2) cache unit 1576. In one exemplary embodiment, the memory access units 1564 may include a load unit, a store address unit, and a store data unit, each of which is coupled to the data TLB unit 1572 in the memory unit 1570. The instruction cache unit 1534 is further coupled to a level 2 (L2) cache unit 1576 in the memory unit 1570. The L2 cache unit 1576 is coupled to one or more other levels of cache and eventually to a main memory.

By way of example, the exemplary register renaming, out-of-order issue/execution core architecture may implement the pipeline 1500 as follows: 1) the instruction fetch 1538 performs the fetch and length decoding stages 1502 and 1504; 2) the decode unit 1540 performs the decode stage 1506; 3) the rename/allocator unit 1552 performs the allocation stage 1508 and renaming stage 1510; 4) the scheduler unit(s) 1556 performs the schedule stage 1512; 5) the physical register file(s) unit(s) 1558 and the memory unit 1570 perform the register read/memory read stage 1514; the execution cluster 1560 perform the execute stage 1516; 6) the memory unit 1570 and the physical register file(s) unit(s) 1558 perform the write back/memory write stage 1518; 7) various units may be involved in the exception handling stage 1522; and 8) the retirement unit 1554 and the physical register file(s) unit(s) 1558 perform the commit stage 1524.

The core 1590 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1590 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1534/1574 and a shared L2 cache unit 1576, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 16B:
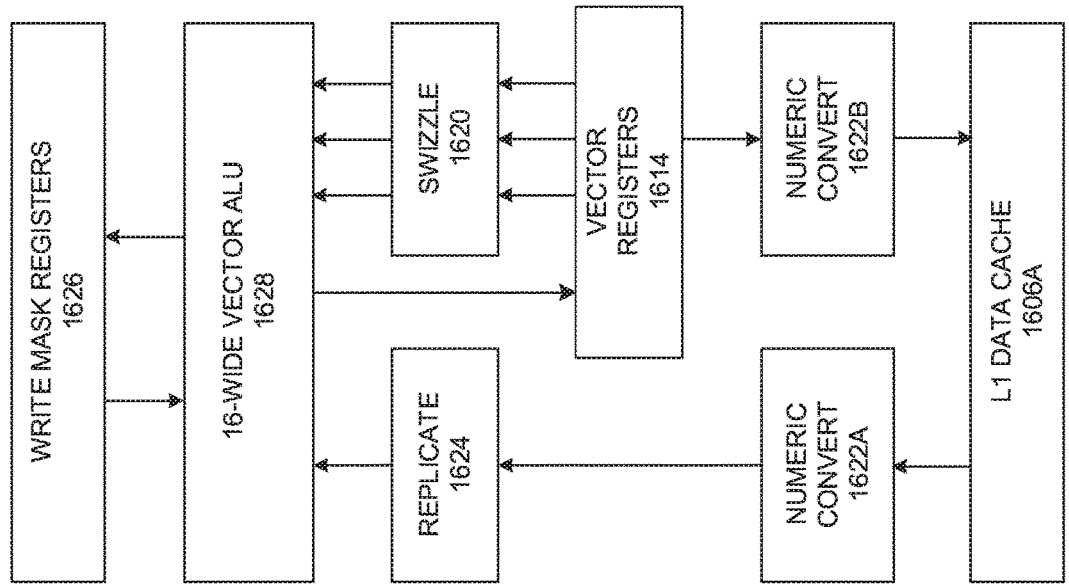
FIG. 16B is a block diagram of an embodiment of an expanded view of part of the processor core of FIG. 16A.
Figure 16A:
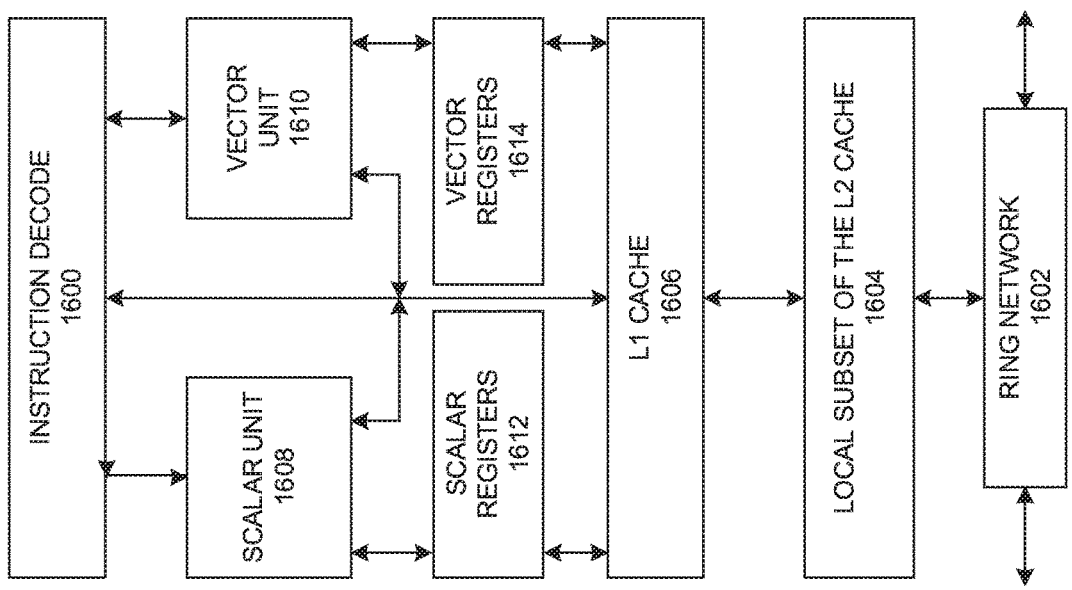
FIG. 16A is a block diagram of an embodiment of a single processor core, along with its connection to the on-die interconnect network, and with its local subset of the Level 2 (L2) cache.

FIGS. 16A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 16A is a block diagram of a single processor core, along with its connection to the on-die interconnect network 1602 and with its local subset of the Level 2 (L2) cache 1604, according to embodiments of the invention. In one embodiment, an instruction decoder 1600 supports the x86 instruction set with a packed data instruction set extension. An L1 cache 1606 allows low-latency accesses to cache memory into the scalar and vector units. While in one embodiment (to simplify the design), a scalar unit 1608 and a vector unit 1610 use separate register sets (respectively, scalar registers 1612 and vector registers 1614) and data transferred between them is written to memory and then read back in from a level 1 (L1) cache 1606, alternative embodiments of the invention may use a different approach (e.g., use a single register set or include a communication path that allow data to be transferred between the two register files without being written and read back).

The local subset of the L2 cache 1604 is part of a global L2 cache that is divided into separate local subsets, one per processor core. Each processor core has a direct access path to its own local subset of the L2 cache 1604. Data read by a processor core is stored in its L2 cache subset 1604 and can be accessed quickly, in parallel with other processor cores accessing their own local L2 cache subsets. Data written by a processor core is stored in its own L2 cache subset 1604 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 16B is an expanded view of part of the processor core in FIG. 16A according to embodiments of the invention. FIG. 16B includes an L1 data cache 1606A part of the L1 cache 1604, as well as more detail regarding the vector unit 1610 and the vector registers 1614. Specifically, the vector unit 1610 is a 16-wide vector processing unit (VPU) (see the 16-wide ALU 1628), which executes one or more of integer, single-precision float, and double-precision float instructions. The VPU supports swizzling the register inputs with swizzle unit 1620, numeric conversion with numeric convert units 1622A-B, and replication with replication unit 1624 on the memory input. Write mask registers 1626 allow predicating resulting vector writes.

Processor with Integrated Memory Controller and Graphics

Figure 17:
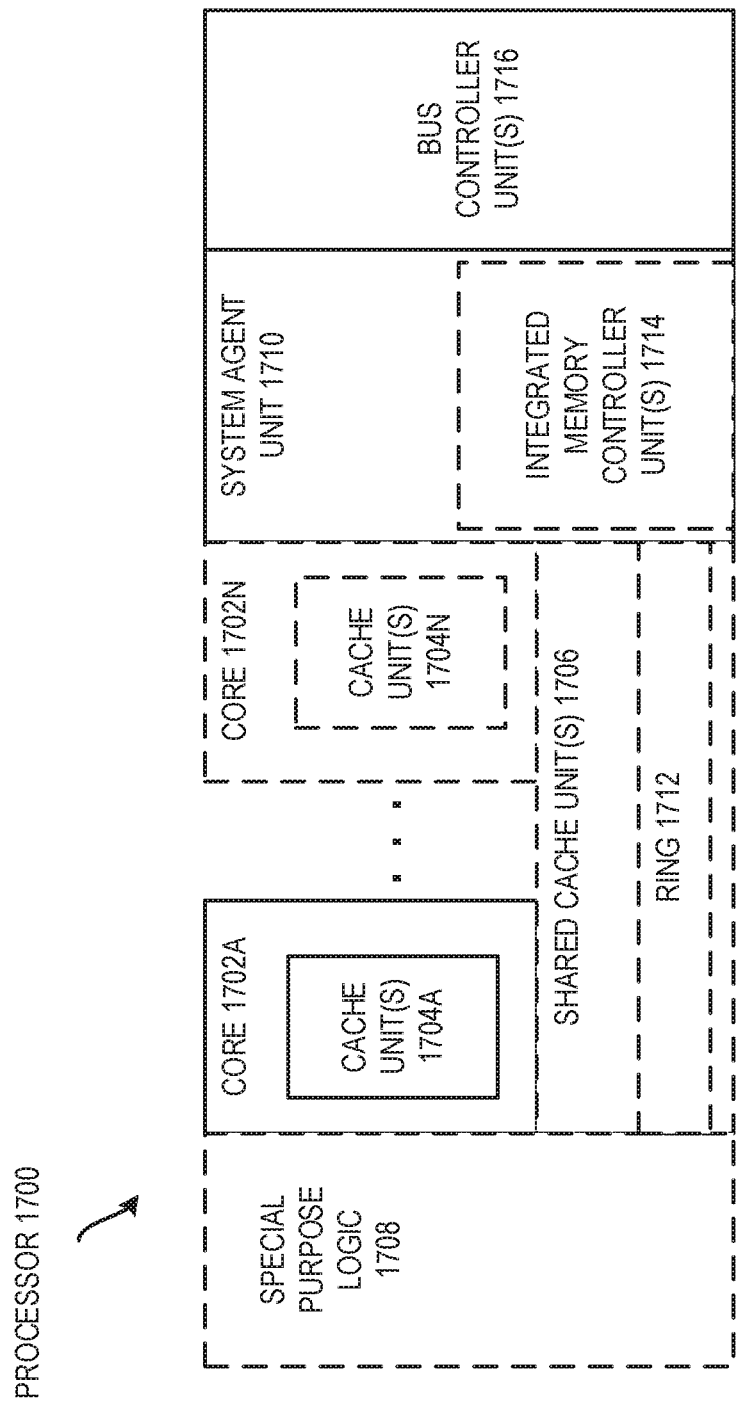
FIG. 17 is a block diagram of an embodiment of a processor that may have more than one core, may have an integrated memory controller, and may have integrated graphics.

FIG. 17 is a block diagram of a processor 1700 that may have more than one core, may have an integrated memory controller, and may have integrated graphics according to embodiments of the invention. The solid lined boxes in FIG. 17 illustrate a processor 1700 with a single core 1702A, a system agent 1710, a set of one or more bus controller units 1716, while the optional addition of the dashed lined boxes illustrates an alternative processor 1700 with multiple cores 1702A-N, a set of one or more integrated memory controller unit(s) 1714 in the system agent unit 1710, and special purpose logic 1708.

Thus, different implementations of the processor 1700 may include: 1) a CPU with the special purpose logic 1708 being integrated graphics and/or scientific (throughput) logic (which may include one or more cores), and the cores 1702A-N being one or more general purpose cores (e.g., general purpose in-order cores, general purpose out-of-order cores, a combination of the two); 2) a coprocessor with the cores 1702A-N being a large number of special purpose cores intended primarily for graphics and/or scientific (throughput); and 3) a coprocessor with the cores 1702A-N being a large number of general purpose in-order cores. Thus, the processor 1700 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1700 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1706, and external memory (not shown) coupled to the set of integrated memory controller units 1714. The set of shared cache units 1706 may include one or more mid-level caches, such as level 2 (L2), level 3 (L3), level 4 (L4), or other levels of cache, a last level cache (LLC), and/or combinations thereof. While in one embodiment a ring based interconnect unit 1712 interconnects the integrated graphics logic 1708, the set of shared cache units 1706, and the system agent unit 1710/integrated memory controller unit(s) 1714, alternative embodiments may use any number of well-known techniques for interconnecting such units. In one embodiment, coherency is maintained between one or more cache units 1706 and cores 1702-A-N.

In some embodiments, one or more of the cores 1702A-N are capable of multi-threading. The system agent 1710 includes those components coordinating and operating cores 1702A-N. The system agent unit 1710 may include for example a power control unit (PCU) and a display unit. The PCU may be or include logic and components needed for regulating the power state of the cores 1702A-N and the integrated graphics logic 1708. The display unit is for driving one or more externally connected displays.

The cores 1702A-N may be homogenous or heterogeneous in terms of architecture instruction set; that is, two or more of the cores 1702A-N may be capable of execution the same instruction set, while others may be capable of executing only a subset of that instruction set or a different instruction set.

Exemplary Computer Architectures

FIGS. 18-21 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 18:
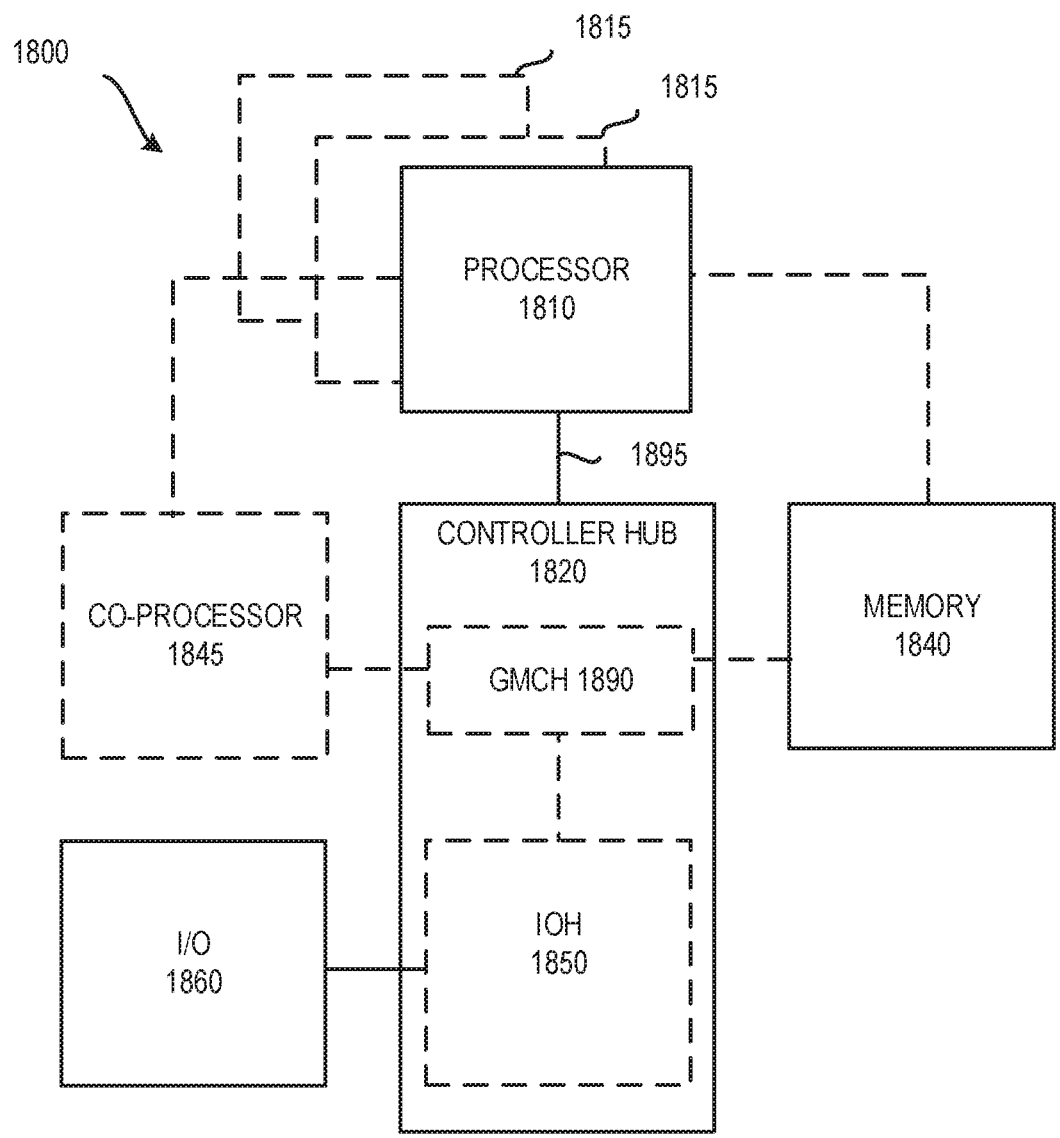
FIG. 18 is a block diagram of a first embodiment of a computer architecture.

Referring now to FIG. 18, shown is a block diagram of a system 1800 in accordance with one embodiment of the present invention. The system 1800 may include one or more processors 1810, 1815, which are coupled to a controller hub 1820. In one embodiment the controller hub 1820 includes a graphics memory controller hub (GMCH) 1890 and an Input/Output Hub (IOH) 1850 (which may be on separate chips); the GMCH 1890 includes memory and graphics controllers to which are coupled memory 1840 and a coprocessor 1845; the IOH 1850 is couples input/output (I/O) devices 1860 to the GMCH 1890. Alternatively, one or both of the memory and graphics controllers are integrated within the processor (as described herein), the memory 1840 and the coprocessor 1845 are coupled directly to the processor 1810, and the controller hub 1820 in a single chip with the IOH 1850.

The optional nature of additional processors 1815 is denoted in FIG. 18 with broken lines. Each processor 1810, 1815 may include one or more of the processing cores described herein and may be some version of the processor 1700.

The memory 1840 may be, for example, dynamic random access memory (DRAM), phase change memory (PCM), or a combination of the two. For at least one embodiment, the controller hub 1820 communicates with the processor(s) 1810, 1815 via a multi-drop bus, such as a frontside bus (FSB), point-to-point interface such as QuickPath Interconnect (QPI), or similar connection 1895.

In one embodiment, the coprocessor 1845 is a special-purpose processor, such as, for example, a high-throughput MIC processor, a network or communication processor, compression engine, graphics processor, GPGPU, embedded processor, or the like. In one embodiment, controller hub 1820 may include an integrated graphics accelerator.

There can be a variety of differences between the physical resources 1810, 1815 in terms of a spectrum of metrics of merit including architectural, microarchitectural, thermal, power consumption characteristics, and the like.

In one embodiment, the processor 1810 executes instructions that control data processing operations of a general type. Embedded within the instructions may be coprocessor instructions. The processor 1810 recognizes these coprocessor instructions as being of a type that should be executed by the attached coprocessor 1845. Accordingly, the processor 1810 issues these coprocessor instructions (or control signals representing coprocessor instructions) on a coprocessor bus or other interconnect, to coprocessor 1845. Coprocessor(s) 1845 accept and execute the received coprocessor instructions.

Figure 19:
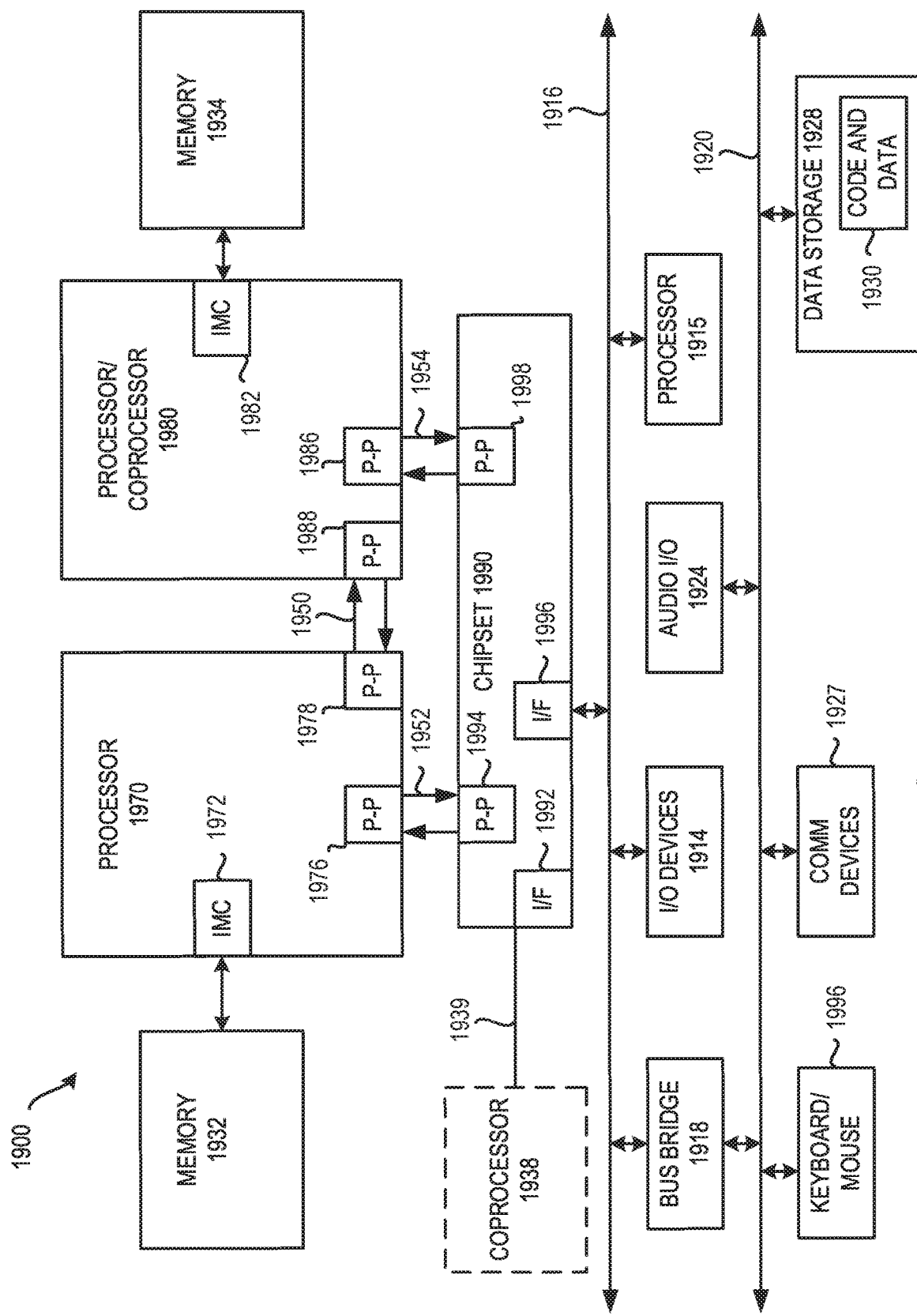
FIG. 19 is a block diagram of a second embodiment of a computer architecture.

Referring now to FIG. 19, shown is a block diagram of a first more specific exemplary system 1900 in accordance with an embodiment of the present invention. As shown in FIG. 19, multiprocessor system 1900 is a point-to-point interconnect system, and includes a first processor 1970 and a second processor 1980 coupled via a point-to-point interconnect 1950. Each of processors 1970 and 1980 may be some version of the processor 1700. In one embodiment of the invention, processors 1970 and 1980 are respectively processors 1810 and 1815, while coprocessor 1938 is coprocessor 1845. In another embodiment, processors 1970 and 1980 are respectively processor 1810 coprocessor 1845.

Processors 1970 and 1980 are shown including integrated memory controller (IMC) units 1972 and 1982, respectively. Processor 1970 also includes as part of its bus controller units point-to-point (P-P) interfaces 1976 and 1978; similarly, second processor 1980 includes P-P interfaces 1986 and 1988. Processors 1970, 1980 may exchange information via a point-to-point (P-P) interface 1950 using P-P interface circuits 1978, 1988. As shown in FIG. 19, IMCs 1972 and 1982 couple the processors to respective memories, namely a memory 1932 and a memory 1934, which may be portions of main memory locally attached to the respective processors.

Processors 1970, 1980 may each exchange information with a chipset 1990 via individual P-P interfaces 1952, 1954 using point to point interface circuits 1976, 1994, 1986, 1998. Chipset 1990 may optionally exchange information with the coprocessor 1938 via a high-performance interface 1939. In one embodiment, the coprocessor 1938 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1990 may be coupled to a first bus 1916 via an interface 1996. In one embodiment, first bus 1916 may be a Peripheral Component Interconnect (PCI) bus, or a bus such as a PCI Express bus or another third generation I/O interconnect bus, although the scope of the present invention is not so limited.

As shown in FIG. 19, various I/O devices 1914 may be coupled to first bus 1916, along with a bus bridge 1918 which couples first bus 1916 to a second bus 1920. In one embodiment, one or more additional processor(s) 1915, such as coprocessors, high-throughput MIC processors, GPGPU's, accelerators (such as, e.g., graphics accelerators or digital signal processing (DSP) units), field programmable gate arrays, or any other processor, are coupled to first bus 1916. In one embodiment, second bus 1920 may be a low pin count (LPC) bus. Various devices may be coupled to a second bus 1920 including, for example, a keyboard and/or mouse 1922, communication devices 1927 and a storage unit 1928 such as a disk drive or other mass storage device which may include instructions/code and data 1930, in one embodiment. Further, an audio I/O 1924 may be coupled to the second bus 1920. Note that other architectures are possible. For example, instead of the point-to-point architecture of FIG. 19, a system may implement a multi-drop bus or other such architecture.

Figure 20:
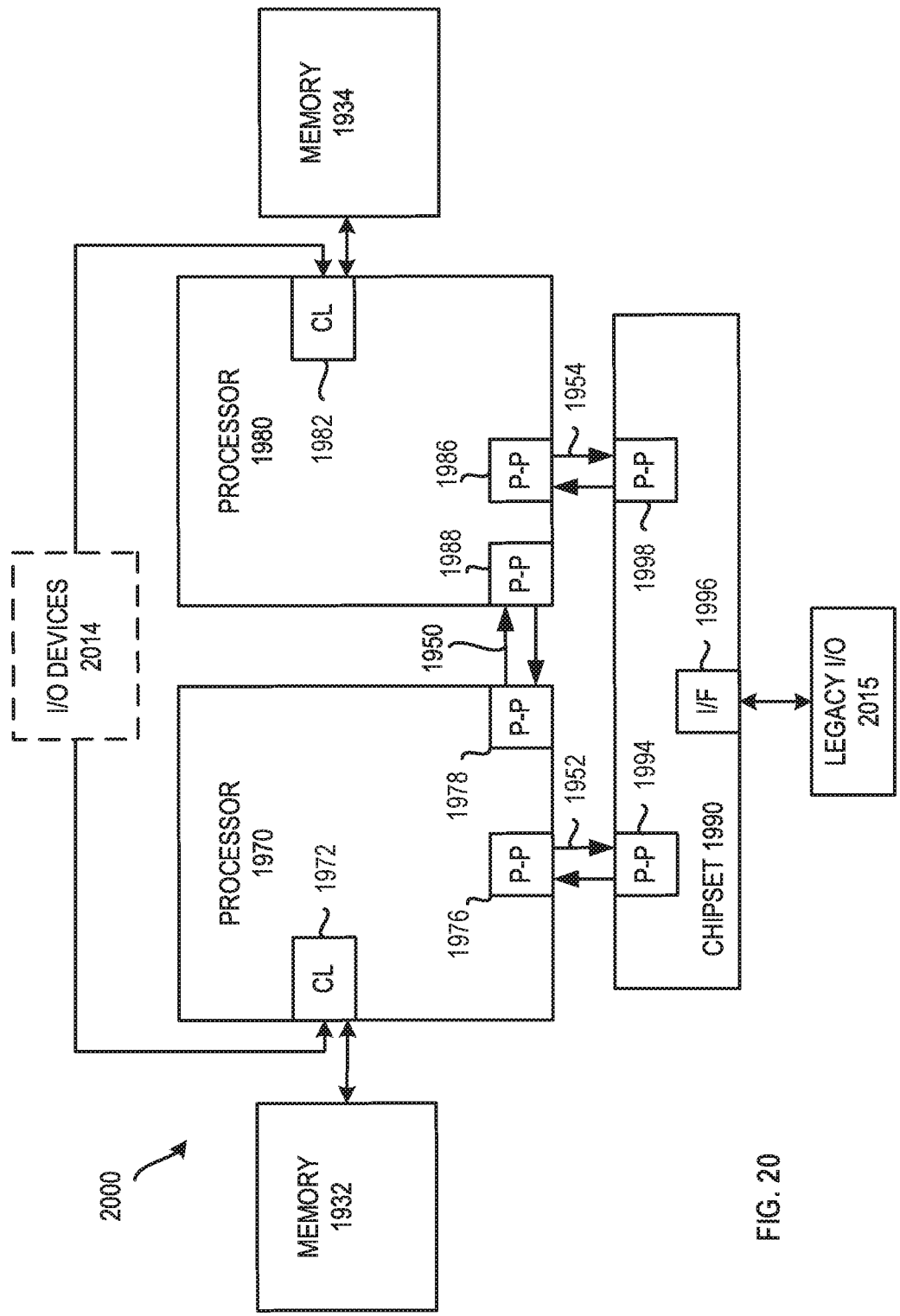
FIG. 20 is a block diagram of a third embodiment of a computer architecture.

Referring now to FIG. 20, shown is a block diagram of a second more specific exemplary system 2000 in accordance with an embodiment of the present invention. Like elements in FIGS. 19 and 20 bear like reference numerals, and certain aspects of FIG. 19 have been omitted from FIG. 20 in order to avoid obscuring other aspects of FIG. 20.

FIG. 20 illustrates that the processors 1970, 1980 may include integrated memory and I/O control logic ("CL") 1972 and 1982, respectively. Thus, the CL 1972, 1982 include integrated memory controller units and include I/O control logic. FIG. 20 illustrates that not only are the memories 1932, 1934 coupled to the CL 1972, 1982, but also that I/O devices 2014 are also coupled to the control logic 1972, 1982. Legacy I/O devices 2015 are coupled to the chipset 1990.

Figure 21:
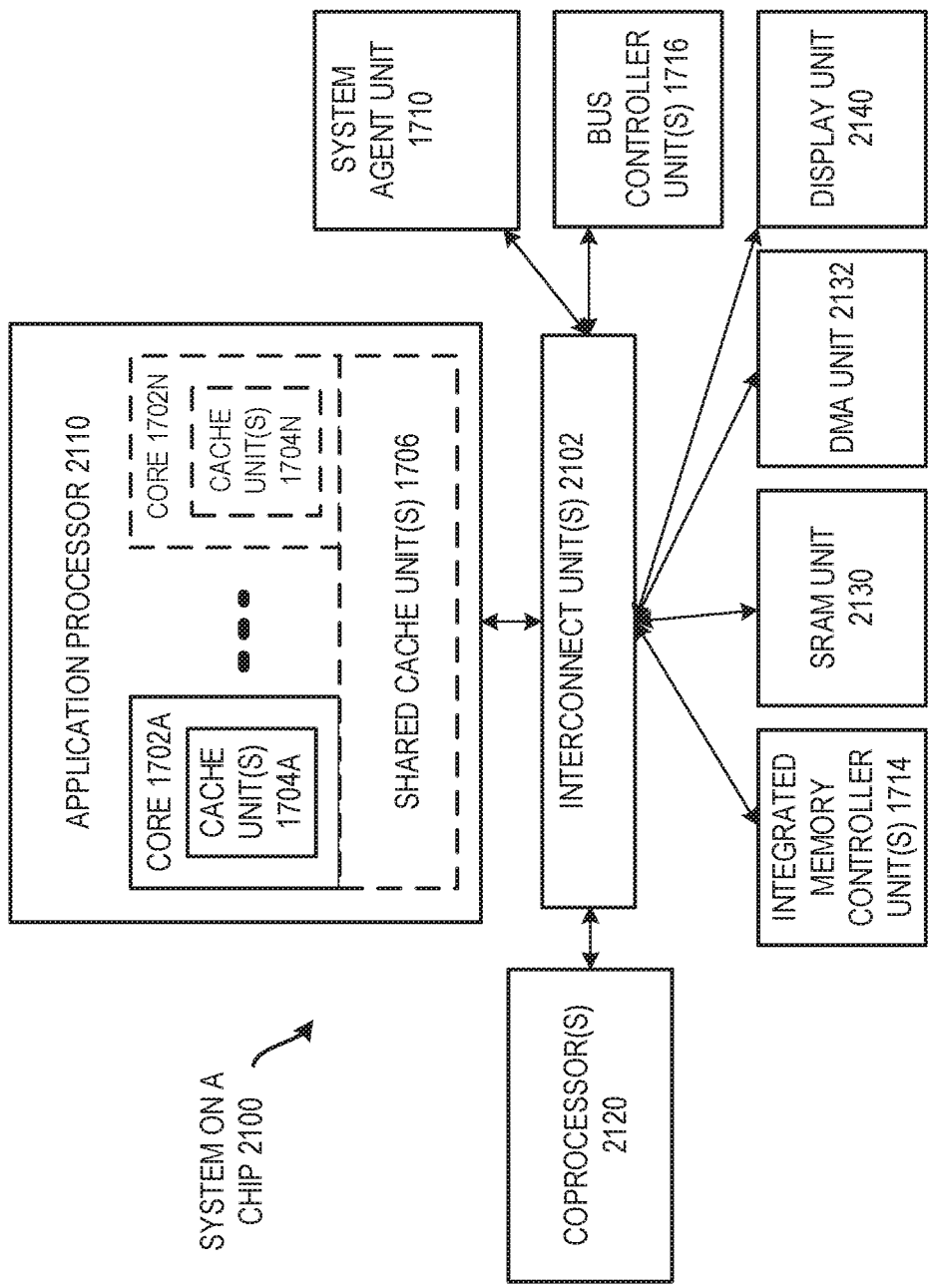
FIG. 21 is a block diagram of a fourth embodiment of a computer architecture.

Referring now to FIG. 21, shown is a block diagram of a SoC 2100 in accordance with an embodiment of the present invention. Similar elements in FIG. 17 bear like reference numerals. Also, dashed lined boxes are optional features on more advanced SoCs. In FIG. 21, an interconnect unit(s) 2102 is coupled to: an application processor 2110 which includes a set of one or more cores 202A-N and shared cache unit(s) 1706; a system agent unit 1710; a bus controller unit(s) 1716; an integrated memory controller unit(s) 1714; a set or one or more coprocessors 2120 which may include integrated graphics logic, an image processor, an audio processor, and a video processor; an static random access memory (SRAM) unit 2130; a direct memory access (DMA) unit 2132; and a display unit 2140 for coupling to one or more external displays. In one embodiment, the coprocessor(s) 2120 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1930 illustrated in FIG. 19, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 22:
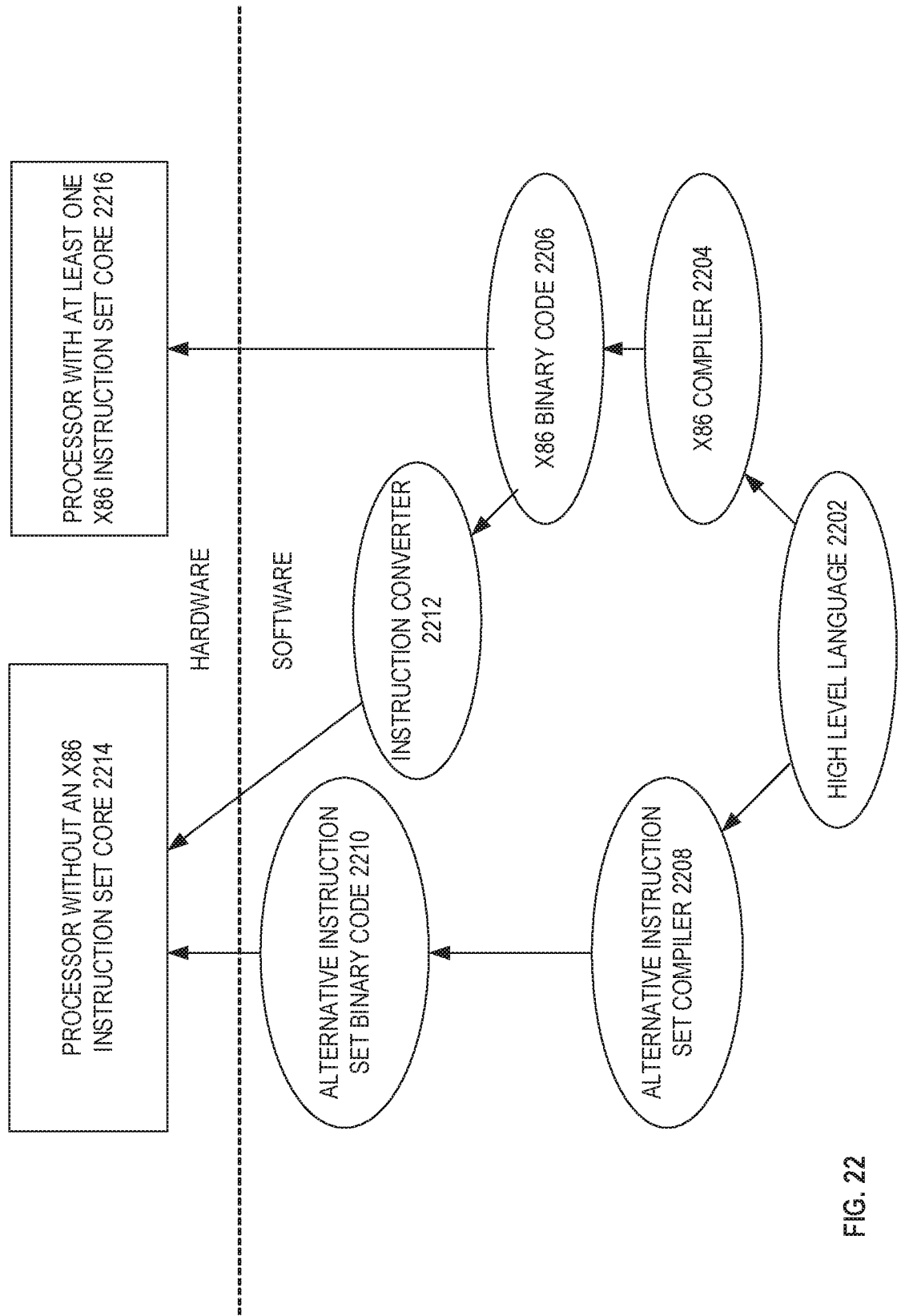
FIG. 22 is a block diagram of use of a software instruction converter to convert binary instructions in a source instruction set to binary instructions in a target instruction set, according to embodiments of the invention.

FIG. 22 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 22 shows a program in a high level language 2202 may be compiled using an x86 compiler 2204 to generate x86 binary code 2206 that may be natively executed by a processor with at least one x86 instruction set core 2216. The processor with at least one x86 instruction set core 2216 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2204 represents a compiler that is operable to generate x86 binary code 2206 (e.g., object code) that can, with or without additional linkage processing, be executed on the processor with at least one x86 instruction set core 2216. Similarly, FIG. 22 shows the program in the high level language 2202 may be compiled using an alternative instruction set compiler 2208 to generate alternative instruction set binary code 2210 that may be natively executed by a processor without at least one x86 instruction set core 2214 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2212 is used to convert the x86 binary code 2206 into code that may be natively executed by the processor without an x86 instruction set core 2214. This converted code is not likely to be the same as the alternative instruction set binary code 2210 because an instruction converter capable of this is difficult to make; however, the converted code will accomplish the general operation and be made up of instructions from the alternative instruction set. Thus, the instruction converter 2212 represents software, firmware, hardware, or a combination thereof that, through emulation, simulation or any other process, allows a processor or other electronic device that does not have an x86 instruction set processor or core to execute the x86 binary code 2206.

Components, features, and details described for any of FIGS. 3-5, 7-10 may also optionally apply to any of FIGS. 1-2. Components, features, and details described for any of the processors disclosed herein (e.g., processor 100) may optionally apply to any of the methods disclosed herein (e.g., method 224), which in embodiments may optionally be performed by and/or with such processors. Any of the processors described herein (e.g., processor 100), in some embodiments, may optionally be included in any of the systems disclosed herein (e.g., any of the systems of FIGS. 18-21). In addition, any of the instructions disclosed herein (e.g., instruction 102) may in some embodiments optionally have any of the features or details of the instruction formats shown herein (e.g., the formats described for FIGS. 11-13).

Processor components disclosed herein may be said to be to perform an operation. For example, a decoder may be to decode an instruction, an execution unit may be to store a result, etc. For clarity, it is to be understood that these expressions do not imply that the processor components are in operation or use, but rather refer to what the processor components are capable of doing, or able to do, if or when they are in operation, but in the processor or apparatus claims herein these processor components are understood to be not currently in operation or use.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures, arrows are used to show connections and couplings.

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, potion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operative to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operative to cause the machine to perform and/or result in the machine performing one or operations, methods, or techniques disclosed herein.

In some embodiments, the machine-readable medium may include a tangible and/or non-transitory machine-readable storage medium. For example, the non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In some embodiments, the storage medium may include a tangible medium that includes solid-state matter or material, such as, for example, a semiconductor material, a phase change material, a magnetic solid material, a solid data storage material, etc. Alternatively, a non-tangible transitory computer-readable transmission media, such as, for example, an electrical, optical, acoustical or other form of propagated signals—such as carrier waves, infrared signals, and digital signals, may optionally be used.

Examples of suitable machines include, but are not limited to, a general-purpose processor, a special-purpose processor, a digital logic circuit, an integrated circuit, or the like. Still other examples of suitable machines include a computer system or other electronic device that includes a processor, a digital logic circuit, or an integrated circuit. Examples of such computer systems or electronic devices include, but are not limited to, desktop computers, laptop computers, notebook computers, tablet computers, netbooks, smartphones, cellular phones, servers, network devices (e.g., routers and switches.), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

EXAMPLE EMBODIMENTS

The following examples pertain to further embodiments. Specifics in the examples may be used anywhere in one or more embodiments.

Example 1 is a processor that includes a decode unit to decode an instruction. The instruction is to indicate a source packed data that is to include data elements, and the instruction is to indicate a source mask that is to include mask elements. Each of the mask elements is to correspond to a different one of the data elements. Each of the mask elements is to be one of a masked mask element and an unmasked mask element. An execution unit is coupled with the decode unit. The execution unit, in response to the instruction, is to store a result packed data in a first destination storage location. In cases where the source packed data is to include one or more masked data elements, that are to correspond to one or more masked mask elements, disposed within unmasked data elements, that are to correspond to unmasked mask elements, the result packed data is to include, the unmasked data elements consolidated together without the one or more masked data elements disposed within them. The execution unit is also to store a result in a second destination storage location that is to reflect a number of the unmasked data elements consolidated together in the result packed data.

Example 2 includes the processor of Example 1, in which the execution unit, in response to the instruction, is to store the result in the second destination storage location which is to be the number of the unmasked data elements consolidated together in the result packed data.

Example 3 includes the processor of Example 1, in which the decode unit is to decode the instruction that is to indicate a source value, and in which the execution unit, in response to the instruction, is to store the result in the second destination storage location which is to be a sum of the source value and the number of the unmasked data elements consolidated together in the result packed data.

Example 4 includes the processor of any one of Examples 1 to 3, in which the execution unit, in response to the instruction, is to store the result packed data in which a portion that is not used for the consolidated together unmasked data elements is to include all zeroed data elements.

Example 5 includes the processor of any one of Examples 1 to 3, in which the execution unit, in response to the instruction, is to store the result packed data in which a portion that is not to be used for the consolidated together unmasked data elements is to include data elements initially present in a portion of the first destination storage location immediately prior to the result packed data being stored to the first destination storage location.

Example 6 includes the processor of any one of Examples 1 to 5, in which the decode unit is to decode the instruction that is to have a field to indicate one of a plurality of possible approaches that is to be used to determine a value for a portion of the result packed data that is not to be used for the consolidated together unmasked data elements.

Example 7 includes the processor of any one of Examples 1 to 6, in which the execution unit, in response to the instruction, is to store the result packed data in which the unmasked data elements are to be consolidated together in a least significant portion of the first destination storage location.

Example 8 includes the processor of any one of Examples 1 to 6, in which the execution unit, in response to the instruction, is to store the result packed data in which the unmasked data elements are to be consolidated together in a most significant portion of the first destination storage location.

Example 9 includes the processor of any one of Examples 1 to 8, further including, packed data registers coupled with the execution unit, general-purpose registers coupled with the execution unit, and mask registers coupled with the execution unit. Also, optionally in which the decode unit is to decode the instruction that is to indicate the source mask that is to be stored in a mask register of the mask registers.

Example 10 includes the processor of any one of Examples 1 to 9, in which the decode unit is to decode the instruction that is to indicate the source mask in which each mask element is to be a different single bit, and in which for each masked mask element the single bit is to cleared to zero and for each unmasked mask element the single bit is to be set to one.

Example 11 includes the processor of any one of Examples 1 to 10, further including a mask register coupled with the execution unit that is to be used to store the source mask, and in which only a subset of bits of the mask register are to be used for the source mask.

Example 12 includes the processor of any one of Examples 1 to 11, in which the decode unit is to decode the instruction that is to have an opcode that is to indicate that the unmasked data elements are to be consolidated together regardless of any particular arrangement of the masked and unmasked data elements in the source packed data.

Example 13 is a method performed by a processor that includes receiving an instruction at the processor. The instruction indicating a source packed data that includes data elements, and indicating a source mask that includes mask elements. Each of the mask elements corresponding to a different one of the data elements. Each of the mask elements being one of a masked mask element and an unmasked mask element. The source packed data including one or more masked data elements, that correspond to one or more masked mask elements, disposed within unmasked data elements, which correspond to unmasked mask elements. The method includes storing a result packed data in a first destination storage location in response to the instruction. The result packed data including the unmasked data elements consolidated together, without the one or more masked data elements disposed within them. The method also includes storing a result in a second destination storage location that reflects a number of the unmasked data elements consolidated together in the result packed data.

Example 14 includes the method of Example 13, in which storing the result in the second destination storage location includes storing the number of the unmasked data elements consolidated together in the result packed data.

Example 15 includes the method of Example 13, in which receiving includes receiving the instruction also indicating a source value, and in which storing the result in the second destination storage location includes storing a sum of the source value and the number of the unmasked data elements consolidated together in the result packed data.

Example 16 includes the method of any one of Examples 13 to 15, in which storing the result packed data includes storing a portion that is not used for the consolidated together unmasked data elements that includes all zeroed data elements.

Example 17 includes the method of any one of Examples 13 to 15, in which storing the result packed data includes storing a portion that is not used for the consolidated together unmasked data elements that includes data elements initially present in a portion of the first destination storage location immediately prior to the result packed data being stored to the first destination storage location.

Example 18 includes the method of any one of Examples 13 to 17, in which receiving includes receiving the instruction having a field to indicate one of a plurality of possible approaches that is to be used to determine a value for a portion of the result packed data that is not used for the consolidated together unmasked data elements.

Example 19 includes the method of any one of Examples 13 to 18, in which storing the result packed data includes storing the consolidated unmasked data elements in a least significant portion of first destination storage location.

Example 20 is a computer system including a bus or other interconnect, and a processor coupled with the interconnect. The processor is to receive an instruction. The instruction is to indicate a source packed data that is to include data elements, and the instruction is to indicate a source mask that is to include mask elements. Each of the mask elements is to correspond to a different one of the data elements. Each of the mask elements is to be one of a masked mask element and an unmasked mask element. The processor, in response to the instruction, is to store a result packed data in a first destination storage location. In cases where the source packed data is to include one or more masked data elements, which are to correspond to one or more masked mask elements, disposed within unmasked data elements, which are to correspond to unmasked mask elements, the result packed data is to include the unmasked data elements consolidated together, without the one or more masked data elements disposed within them. The processor is also to store a result in a second destination storage location that is to reflect a number of the unmasked data elements consolidated together in the result packed data. The computer system further includes a dynamic random access memory (DRAM) coupled with the interconnect.

Example 21 is the computer system of Example 20, in which the instruction is to indicate a source value, and in which the result that is to be stored in the second destination storage location is to be a sum of the source value and the number of the unmasked data elements consolidated together in the result packed data.

Example 22 is an article of manufacture including an optionally non-transitory machine-readable storage medium. The machine-readable storage medium storing a plurality of instructions including a first instruction. The first instruction, if performed by a machine, is to cause the machine to perform operations including to access a source packed data that includes data elements, and to access a source mask that includes mask elements. Each of the mask elements is to correspond to a different one of the data elements. Each of the mask elements is to be one of a masked mask element and an unmasked mask element. The operations further include to store a result packed data in a first destination storage location. In cases where the source packed data is to include one or more masked data elements, which are to correspond to one or more masked mask elements, disposed within unmasked data elements, which are to correspond to unmasked mask elements, the result packed data is to include the unmasked data elements consolidated together, without the one or more masked data elements disposed within them. The operations further include to store a result in a second destination storage location that reflects a number of the unmasked data elements consolidated together in the result packed data.

Example 23 includes the article of manufacture of Example 22, in which the first instruction is to indicate a source value, and in which the first instruction, if performed by the machine, is to cause the machine to perform operations including to store the result in the second destination storage location that is to be a sum of the source value and the number of the unmasked data elements consolidated together in the result packed data.

Example 24 includes the article of manufacture of any one of Examples 22 to 23, in which the non-transitory machine-readable storage medium includes one of a dynamic random access memory (DRAM), a flash memory, a hard disk drive, an optical disk, and a magnetic tape.

Example 25 includes a processor that includes means for decoding an instruction. The instruction to indicate a source packed data that is to include data elements, and the instruction to indicate a source mask that is to include mask elements. Each of the mask elements to correspond to a different one of the data elements. Each of the mask elements to be one of a masked mask element and an unmasked mask element. Means, in response to the instruction, for storing a result packed data in a first destination storage location. In cases where the source packed data is to include one or more masked data elements, that are to correspond to one or more masked mask elements, disposed within unmasked data elements, that are to correspond to unmasked mask elements, the result packed data is to include, the unmasked data elements consolidated together, without the one or more masked data elements disposed within them. Means, in response to the instruction, for storing a result in a second destination storage location that is to reflect a number of the unmasked data elements consolidated together in the result packed data.

Example 26 includes the processor of any one of Examples 1 to 12, further including an optional branch prediction unit to predict branches, and an optional instruction prefetch unit, coupled with the branch prediction unit, the instruction prefetch unit to prefetch instructions including the instruction. The processor may also optionally include an optional level 1 (L1) instruction cache coupled with the instruction prefetch unit, the L1 instruction cache to store instructions including the instruction, an optional L1 data cache to store data, and an optional level 2 (L2) cache to store data and instructions. The processor may also optionally include an instruction fetch unit coupled with the decode unit, the L1 instruction cache, and the L2 cache, to fetch the instruction, in some cases from one of the L1 instruction cache and the L2 cache, and to provide the instruction to the decode unit. The processor may also optionally include a register rename unit to rename registers, an optional scheduler to schedule one or more operations that have been decoded from the instruction for execution, and an optional commit unit to commit execution results of the instruction.

Example 27 includes a system-on-chip that includes at least one interconnect, the processor of any one of Examples 1 to 12 coupled with the at least one interconnect, an optional graphics processing unit (GPU) coupled with the at least one interconnect, an optional digital signal processor (DSP) coupled with the at least one interconnect, an optional display controller coupled with the at least one interconnect, an optional memory controller coupled with the at least one interconnect, an optional wireless modem coupled with the at least one interconnect, an optional image signal processor coupled with the at least one interconnect, an optional Universal Serial Bus (USB) 3.0 compatible controller coupled with the at least one interconnect, an optional Bluetooth 4.1 compatible controller coupled with the at least one interconnect, and an optional wireless transceiver controller coupled with the at least one interconnect.

Example 28 is a processor or other apparatus operative to perform the method of any one of Examples 13 to 19.

Example 29 is a processor or other apparatus that includes means for performing the method of any one of Examples 13 to 19.

Example 30 is an optionally non-transitory and/or tangible machine-readable medium, which optionally stores or otherwise provides instructions including a first instruction, the first instruction if and/or when executed by a processor, computer system, electronic device, or other machine, is operative to cause the machine to perform the method of any one of Examples 13 to 19.

Example 31 is a processor or other apparatus substantially as described herein.

Example 32 is a processor or other apparatus that is operative to perform any method substantially as described herein.

Example 33 is a processor or other apparatus that is operative to perform any instruction substantially as described herein.

What is claimed is:

1. A processor comprising:
a decode unit to decode an instruction, the instruction to indicate a source packed data that is to include data elements, the instruction to indicate a source mask that is to include mask elements, each of the mask elements to correspond to a different one of the data elements, each of the mask elements to be one of a masked mask element and an unmasked mask element, and the instruction to indicate a general-purpose register which is to have a scalar source value; and
an execution unit coupled with the decode unit, in response to the instruction, to:
store a result packed data in a first destination storage location, wherein in cases where the source packed data is to include one or more masked data elements that are to correspond to one or more masked mask elements disposed within unmasked data elements that are to correspond to unmasked mask elements, the result packed data is to include, the unmasked data elements consolidated together without the one or more masked data elements disposed within them; and
store a scalar result value in a second destination storage location that is to reflect a number of the unmasked data elements consolidated together in the result packed data, wherein the scalar result value is to be a sum of the scalar source value and the number of the unmasked data elements consolidated together in the result packed data, wherein the second destination storage location is to be the general-purpose register, and wherein it is implicit to the instruction that the scalar source value is to be overwritten by the scalar result value in the general-purpose register.

2. The processor of claim 1, wherein the execution unit, in response to the instruction, is to store the result packed data in which a portion that is not used for the consolidated together unmasked data elements is to include all zeroed data elements.

3. The processor of claim 1, wherein the execution unit, in response to the instruction, is to store the result packed data in which a portion that is not used for the consolidated together unmasked data elements is to include data elements initially present in a portion of the first destination storage location immediately prior to the result packed data being stored to the first destination storage location.

4. The processor of claim 1, wherein the decode unit is to decode the instruction that is to have a field to indicate one of a plurality of possible approaches to be used to determine a value for a portion of the result packed data not used for the consolidated together unmasked data elements.

5. The processor of claim 1, wherein the execution unit, in response to the instruction, is to store the result packed data in which the unmasked data elements are to be consolidated together in a least significant portion of the first destination storage location.

6. The processor of claim 1, wherein the execution unit, in response to the instruction, is to store the result packed data in which the unmasked data elements are to be consolidated together in a most significant portion of the first destination storage location.

7. The processor of claim 1, further comprising:
packed data registers coupled with the execution unit;
general-purpose registers coupled with the execution unit; and
mask registers coupled with the execution unit,
wherein the decode unit is to decode the instruction that is to indicate the source mask that is to be stored in a mask register of the mask registers.

8. The processor of claim 1, wherein the decode unit is to decode the instruction that is to indicate the source mask in which each mask element is to be a different single bit, and wherein for each masked mask element the single bit is to cleared to zero and for each unmasked mask element the single bit is to be set to one.

9. The processor of claim 1, further comprising a mask register coupled with the execution unit that is to be used to store the source mask, and wherein only a subset of bits of the mask register are to be used for the source mask.

10. The processor of claim 1, wherein the decode unit is to decode the instruction that is to have an opcode that is to indicate that the unmasked data elements are to be consolidated together regardless of any particular arrangement of the masked and unmasked data elements in the source packed data.

11. A method performed by a processor comprising:
decoding an instruction with a decode unit of the processor, the instruction indicating a source packed data that includes data elements, indicating a source mask that includes mask elements, each of the mask elements corresponding to a different one of the data elements, each of the mask elements being one of a masked mask element and an unmasked mask element, the source packed data including one or more masked data elements that correspond to one or more masked mask elements disposed within unmasked data elements that correspond to unmasked mask elements, and the instruction indicating a general-purpose register storing a scalar source value;
storing, with an execution unit of the processor, a result packed data in a first destination storage location in response to the instruction, the result packed data including, the unmasked data elements consolidated together without the one or more masked data elements disposed within them; and
storing, with the execution unit of the processor, a scalar result value in a second destination storage location of the instruction, the scalar result value reflecting a number of the unmasked data elements consolidated together in the result packed data, wherein the scalar result value is a sum of the scalar source value and the number of the unmasked data elements consolidated together in the result packed data, wherein the second destination storage location is the general-purpose register, and wherein overwriting the scalar source value with the scalar result value in the general-purpose register is implicit to the instruction.

12. The method of claim 11, wherein said storing the result packed data comprises storing a portion that is not used for the consolidated together unmasked data elements that includes all zeroed data elements.

13. The method of claim 11, wherein said storing the result packed data comprises storing a portion that is not used for the consolidated together unmasked data elements that includes data elements initially present in a portion of the first destination storage location immediately prior to the result packed data being stored to the first destination storage location.

14. The method of claim 11, wherein said receiving comprises receiving the instruction having a field to indicate one of a plurality of possible approaches that is to be used to determine a value for a portion of the result packed data that is not used for the consolidated together unmasked data elements.

15. The method of claim 11, wherein said storing the result packed data comprises storing the consolidated unmasked data elements in a least significant portion of first destination storage location.

16. A computer system comprising:
an interconnect;
a processor coupled with the interconnect, the processor to receive an instruction and including a decode unit to decode the instruction, the instruction to indicate a source packed data that is to include data elements, the instruction to indicate a source mask that is to include mask elements, each of the mask elements to correspond to a different one of the data elements, each of the mask elements to be one of a masked mask element and an unmasked mask element, and the instruction to indicate a general-purpose register that is to store a scalar source value, the processor, in response to the instruction to:
store, with an execution unit of the processor, a result packed data in a first destination storage location, wherein in cases where the source packed data is to include one or more masked data elements that are to correspond to one or more masked mask elements disposed within unmasked data elements that are to correspond to unmasked mask elements, the result packed data is to include, the unmasked data elements consolidated together without the one or more masked data elements disposed within them; and store, with the execution unit of the processor, a scalar result value in a second destination storage location that is to reflect a number of the unmasked data elements consolidated together in the result packed data, wherein the scalar result value is to be a sum of the scalar source value and the number of the unmasked data elements consolidated together in the result packed data, wherein the second destination storage location is to be the general-purpose register, and wherein it is implicit to the instruction that the scalar source value is to be overwritten by the scalar result value in the general-purpose register; and a dynamic random access memory (DRAM) coupled with the interconnect.

17. An article of manufacture comprising a non-transitory machine-readable storage medium, the non-transitory machine-readable storage medium storing a plurality of instructions including a first instruction, the first instruction, if performed by a machine, is to cause the machine to perform operations comprising to:

access a source packed data that includes data elements;

access a source mask that includes mask elements, each of the mask elements corresponding to a different one of the data elements, each of the mask elements being one of a masked mask element and an unmasked mask element;

access a scalar source value from a general-purpose register;

store, with an execution unit of the machine, a result packed data in a first destination storage location, wherein in cases where the source packed data is to include one or more masked data elements that are to correspond to one or more masked mask elements disposed within unmasked data elements that are to correspond to unmasked mask elements, the result packed data is to include, the unmasked data elements consolidated together without the one or more masked data elements disposed within them; and store, with the execution unit of the machine, a scalar result value in a second destination storage location that reflects a number of the unmasked data elements consolidated together in the result packed data, wherein the scalar result value is to be a sum of the scalar source value and the number of the unmasked data elements consolidated together in the result packed data, wherein the second destination storage location is the general-purpose register, and wherein overwriting the scalar source value with the scalar result value in the general-purpose register is implicit to the first instruction.

18. The article of manufacture of claim 17, wherein the non-transitory machine-readable storage medium comprises one of a dynamic random access memory (DRAM), a flash memory, a hard disk drive, an optical disk, and a magnetic tape.

* * * * *